(12) United States Patent
Zhang et al.

(10) Patent No.: US 9,210,693 B2
(45) Date of Patent: Dec. 8, 2015

(54) METHOD, DEVICE, AND BASE STATION FOR TRANSMITTING DATA OF HOTSPOT CELL COVERAGE

(75) Inventors: Shuai Zhang, Shenzhen (CN); Jin Xu, Shenzhen (CN); Jun Xu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 326 days.

(21) Appl. No.: 14/368,502

(22) PCT Filed: Mar. 7, 2012

(86) PCT No.: PCT/CN2012/072041
§ 371 (c)(1),
(2), (4) Date: Sep. 26, 2014

(87) PCT Pub. No.: WO2012/119549
PCT Pub. Date: Sep. 13, 2012

(65) Prior Publication Data
US 2015/0103760 A1   Apr. 16, 2015

(30) Foreign Application Priority Data
Mar. 9, 2011 (CN) .......................... 2011 1 0056385

(51) Int. Cl.
*H04W 72/04* (2009.01)
*H04L 1/00* (2006.01)
*H04W 28/18* (2009.01)

(52) U.S. Cl.
CPC ................. *H04W 72/04* (2013.01); *H04L 1/00* (2013.01); *H04W 28/18* (2013.01)

(58) Field of Classification Search
None
See application file for complete search history.

(56) References Cited

U.S. PATENT DOCUMENTS 8,432,794 B2 *  4/2013  Terry .................... H04L 1/0025
                                                            370/229
2006/0067229 A1    3/2006  Frederiksen
(Continued)

FOREIGN PATENT DOCUMENTS

| CN | 101032138 A | 9/2007 |
| CN | 101159951 A | 4/2008 |

(Continued)

OTHER PUBLICATIONS

International Search Report in international application No. PCT/CN2012/072041, mailed on May 31, 2012. (3 pages—see entire document).

(Continued)

*Primary Examiner* — Kwang B Yao
*Assistant Examiner* — Adam Duda
(74) *Attorney, Agent, or Firm* — Oppedahl Patent Law Firm LLC

(57) ABSTRACT

A method for transmitting data of hotspot cell coverage includes: a base station adjusts a Modulation and Coding Scheme (MCS) table allowing the same to satisfy a 256 QAM modulation scheme, and acquires layer 1 Transport Block Size (TBS) when the modulation scheme is 256 QAM; on the basis of $N_{PRB}$, $I_{TBS}$ and the number of Transport Block (TB) mapping layers, the base station determines the TBS currently transmitting data, and transmits data on the basis of the TBS. Also provided is a device and base station for transmitting data. Employment of the method, device, and base station for transmitting the data of hotspot cell coverage of embodiments of the disclosure allows for optimized modulation scheme for the same to support up to 256 QAM, and for improved system throughput, thus solving the problem in hotspot cell coverage of system transmission speed not capable of satisfying actual demand.

14 Claims, 4 Drawing Sheets

--- step a. a base station adjusts a MCS table allowing the same to satisfy a 256 QAM modulation scheme, and acquires layer 1 TBS when the modulation scheme is 256 QAM step b. on the basis of ($N_{PRB}$, $I_{TBS}$) and the current number of TB mapping layers, the base station determines the TBS currently transmitting data, and transmits data on the basis of the TBS

(56) References Cited

U.S. PATENT DOCUMENTS

| | | |
|---|---|---|
| 2010/0195614 A1 | 8/2010 | Nimbalker et al. |
| 2010/0303016 A1* | 12/2010 | Jin ................... H04L 27/0008 370/328 |
| 2012/0008574 A1 | 1/2012 | Xiao et al. |
| 2012/0076028 A1* | 3/2012 | Ko ..................... H04L 1/0026 370/252 |
| 2012/0281779 A1* | 11/2012 | Goransson ........... H04L 1/0025 375/267 |
| 2013/0182789 A1* | 7/2013 | Ko ..................... H04L 1/0026 375/267 |
| 2013/0322361 A1* | 12/2013 | Ko ..................... H04L 1/0026 370/329 |

FOREIGN PATENT DOCUMENTS

| | | |
|---|---|---|
| CN | 101384072 A | 3/2009 |
| CN | 101640579 A | 2/2010 |
| CN | 101651515 A | 2/2010 |

OTHER PUBLICATIONS

English Translation of the Written Opinion of the International Search Authority in international application No. PCT/CN2012/072041, mailed on May 31, 2012. (7 pages—see entire document).

* cited by examiner

METHOD, DEVICE, AND BASE STATION FOR TRANSMITTING DATA OF HOTSPOT CELL COVERAGE

TECHNICAL FIELD

The disclosure relates to a mobile communication field, and particularly to a method, device and base station for transmitting data of hotspot cell coverage.

BACKGROUND

Long Term Evolution Advanced (LTE-A) system, as the standard evolution of Long Term Evolution (LTE) system, proposes enhanced Multiple Input Multiple Output (MIMO) technology, which can support a maximum of 8×8 downlink antenna configuration and improve coverage and throughput on cell edge.

LTE-A requires 4 G communication not only to meet high peak rates and large bandwidth, but also to ensure experience of users at all regions. As statistics show that 80%-90% of the throughput of the system will occur in the interior and hotspot nomadic scenarios, the interior high-speed hotspot will become more important application scenario to the mobile internet.

In wireless communication, the sender uses multiple antennas, and adopts spatial multiplexing approach to improve the transmission rate, and the receiver, such as User Terminal (UE), also uses multiple antennas. As the number of antennas increases, the channel rank also increases, and the number of layers for transmitting data also increases correspondingly. In LTE, each TB (Transport Block) can only transmit on two layers, while LTE-A supports each TB to transmit on up to four layers.

In release R10, layers 1-4 of TBS (Transport Block Size) is found by way of looking up MCS table, wherein, layer 1 TBS is jointly determined by taking $I_{TBS}$ (Index Transport Block Size) as index row and taking $N_{PRB}$ (Num Physical Resource Block) as index column. For layer 2 of TB size, i.e., TBS, when $1 \leq N_{PRB} \leq 55$, the corresponding TBS in layer 1 TBS table is found via the index ($I_{TBS}$, $2 \cdot N_{PRB}$) from layer 1 TBS table, namely the value of layer 2 TBS; when $56 \leq N_{PRB} \leq 110$, $N_{PRB}$ and $I_{TBS}$ of layer 2 TBS is obtained, layer 1 TBS is found by the $N_{PRB}$ and $I_{TBS}$, and then the sized of layer 2 TBS corresponding to layer 1 TBS is found with the conversion relation table of layers 1-2.

Before performing channel coding, the mapping of layer 1 TBS to three, layer 4 TBS carries out CRC (Cyclical Redundancy Check) treatment to the transmitted data, i.e., a number of CRC data bits are added at the tail of data to determine whether the decoded data is correct at the receiving end. When transmitting a longer TB (when transport block is longer than 6144 bits), it needs to be processed in segment, and while adding the TB CRC to the TV, CRC inspection information is respectively added on the segment-processed CB. A complete transmission block, when it is longer than 6144 bits, should include the sum of TBS+TBCRC+CBCRC, wherein TBCRC is the size of the transport block CRC, CBCRC is the size of code block CRC, so it only needs to determine the value of TBS to make a TBS table.

Determine the mapped TBS through the approximate multiple relationship of layer 1 TBS to layers 2, 3 and 4 of TBS, wherein TBS_L1 represents layer 1 TBS, TBS_LN represents n layers of mapped TBS, $TB_1\_crc$ represents the TBSRC corresponding to layer 1 TBS, $TB_N\_crc$ represents the TBCRC corresponding to n layers of mapped TBS, $cb_1\_crc$ represents the divided CBCRC of layer 1 TBS, $cb_N\_crc$ represents the CBCRC corresponding to n layers of mapped TBS, specific formula is as follows:

$$(TBS\_L1 + TB_1\_crc + cb_1\_crc) \times n = TBS\_LN + TB_N\_crc + cb_N\_crc$$

In the cell coverage area obtained by the above formula, when the TBS<299856 bits, layers 1-4 TBS try to reuse values of layers 1-4 TBS in R10, this principle will not additionally add excess TBS, so as to facilitate transmission scheduling; when TBS_LN>299856 bits, the newly increased TBS should be divisible by QPP interleaver parameters k, increasing suitability of multi-TBS, and reducing padding.

The modulation scheme in current release can not support 256 QAM, resulting in that system throughput is insufficient, and the system transmission rate can not meet the actual demand during hotspot cell coverage. Therefore, the technical problem to be solved at present has been how to optimize the current modulation scheme for the same to support 256 QAM, and improve system throughput, thus solving the problem in hotspot cell coverage of system transmission speed not capable of satisfying actual demand.

SUMMARY

Purpose of the embodiments of the disclosure is to provide a method, device and base station for transmitting data of hotspot cell coverage, in order to optimize modulation scheme for the same to support up to 256 QAM, and improve system throughput, thus solving the problem in hotspot cell coverage of system transmission speed not capable of satisfying actual demand.

In order to solve the technical problem described above, embodiments of the disclosure provide a method for transmitting data of hotspot cell coverage, which includes:

Step a. a base station adjusts a Modulation and Coding Scheme (MCS) table allowing the same to satisfy a 256 QAM modulation scheme, and acquires layer 1 of Transport Block Size (TBS) when the modulation scheme is 256 QAM;

Step b. on the basis of $N_{PRB}$, $I_{TBS}$ and the number of transport block mapping layers, the base station determines the TBS currently transmitting data, and transmits data on the basis of the TBS.

Furthermore, "acquiring layer 1 of Transport Block Size (TBS) when the modulation scheme is 256 QAM" described in the step a, includes: on the basis of $N_{PRB}$ and $I_{TBS}$, taking $I_{TBS}$ as index row, taking $N_{PRB}$ as index column, the base station looks up MCS table to acquire layer 1 TBS when the modulation scheme is 256 QAM.

Furthermore, layer 1 TBS, when the modulation scheme is 256 QAM, is acquired by adopting any one or several of the following ways:

Way a1, the corresponding modulation scheme when the value of $I_{TBS}$ in the MCS table ranges from 23 to 26 is made to satisfy 256 QAM;

Way a2, the corresponding modulation scheme when the value of $I_{TBS}$ in the MCS table ranges from 21 to 26 is made to satisfy 256 QAM;

Way a3, the corresponding modulation scheme when the value of $I_{TBS}$ in the MCS table ranges from 27 to 30 is made to satisfy 256 QAM;

Way a4, the corresponding modulation scheme when the value of $I_{TBS}$ in the MCS table ranges from 27 to 32 is made to satisfy 256 QAM.

Furthermore, "on the basis of $N_{PRB}$, $I_{TBS}$ and the number of transport block mapping layers, the base station determines the TBS currently transmitting data" described in step b, includes: when $1 \leq N_{PRB} \leq 55$, the corresponding TBS in layer 1 TBS table is found via the index ($I_{TBS}$, $2 \cdot N_{PRB}$) from layer 1 TBS table, namely the value of layer 2 TBS; when $56 \leq N_{PRB} \leq 110$, on the basis of $N_{PRB}$ and $I_{TBS}$, layer 1 TBS is found from layer 1 TBS table, and the corresponding TBS in the conversion relation of layers 1-2 TBS is found by layer 1 TBS, namely the value of layer 2 TBS.

Furthermore, "on the basis of $N_{PRB}$, $I_{TBS}$ and the number of transport block mapping layers, the base station determines the TBS currently transmitting data" described in step b, includes: when $1 \leq N_{PRB} \leq 36$, the corresponding TBS in layer 1 TBS table is found via the index ($I_{TBS}$, $3 \cdot N_{PRB}$) from layer 1 TBS table, namely the value of layer 3 TBS; when $37 \leq N_{PRB} \leq 110$, on the basis of $N_{PRB}$ and $I_{TBS}$, layer 1 TBS is determined from layer 1 TBS table, and the corresponding TBS in the conversion layer 4 TBS of layers 1-3 TBS is found by layer 1 TBS, namely the value of layer 3 TBS.

Furthermore, "on the basis of $N_{PRB}$, $I_{TBS}$ and the number of transport block mapping layers, the base station determines the TBS currently transmitting data" described in step b, includes: when $1 \leq N_{PRB} \leq 27$, the corresponding TBS in layer 1 TBS table is found via the index ($I_{TBS}$, $4 \cdot N_{PRB}$) from layer 1 TBS table, namely the value of layer 4 TBS; when $28 \leq N_{PRB} \leq 110$, on the basis of $N_{PRB}$ and $I_{TBS}$, layer 1 TBS is determined from layer 1 TBS table, and the corresponding TBS in the conversion layer 4 TBS of layers 1-4 TBS is found by layer 1 TBS, namely the value of layer 4 TBS.

Embodiments of the disclosure also provide a device for transmitting data of hotspot cell coverage, which includes an adjustment unit, an acquisition unit, and a transmission unit, wherein, the adjustment unit is configured to adjust a MCS table allowing the same to satisfy a 256 QAM modulation scheme; the acquisition unit is configured to acquire layer 1 TBS when the modulation scheme is 256 QAM; and the transmission unit is configured to, on the basis of $N_{PRB}$, $I_{TBS}$ and the number of TB mapping layers, determine the TBS currently transmit data, and transmit data on the basis of the TBS.

Embodiments of the disclosure also provide a base station, which includes a device for transmitting data. The device for transmitting data includes an adjustment unit, an acquisition unit, and a transmission unit, wherein the adjustment unit is configured to adjust a MCS table allowing the same to satisfy a 256 QAM modulation scheme; the acquisition unit is configured to acquire layer 1 TBS when the modulation scheme is 256 QAM; and the transmission unit is configured to, on the basis of $N_{PRB}$, $I_{TBS}$ and the number of TB mapping layers, determine the TBS currently transmit data, and transmit data on the basis of the TBS.

Comparing with the prior art, the method, device and base station for transmitting data of hotspot cell coverage provided in embodiments of the disclosure, can optimize modulation scheme for the same to support up to 256 QAM, and improve system throughput, thus solving the problem in hotspot cell coverage of system transmission speed not capable of satisfying actual demand.

BRIEF DESCRIPTION OF THE DRAWINGS

Accompanying drawings described herein, which are included to provide a further understanding of the disclosure and constitute a part of the disclosure, illustrate embodiments of the disclosure and together with the description serve to explain the disclosure, but the disclosure is not limited thereto. In the accompanying drawings.

DETAILED DESCRIPTION

To make the technical problem to be solved by the disclosure, the technical solution and the beneficial effect more clear and apparent, the disclosure will be described in more detail below with reference to the embodiments and the accompanying drawings. It should be understood that the specific embodiments described herein are only to explain the disclosure and are not intended to limit the disclosure.

Embodiments of the disclosure provides a method for transmitting data of hotspot cell coverage, with a technical solution as follows: the base station adjusts MCS table allowing the same to satisfy a 256 QAM modulation scheme, and determines layer 1 TBS, and then determines the conversion relation of layers 1-2, layers 1-3 and layers 1-4 TBS in layer 1 of newly increased TBS; the TBS currently transmitting data is determined via the number of TB transmission layers with the TB conversion relation table, and data is transmitted on the basis of the TBS.

Figure 1:
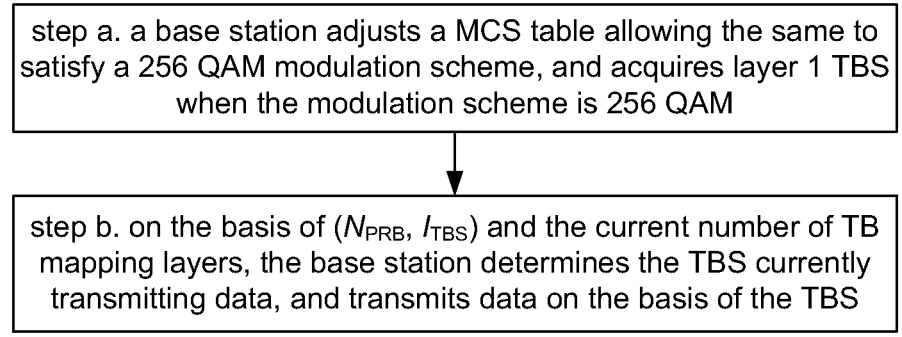
FIG. 1 is a flow diagram of an embodiment of the disclosure.

As shown in FIG. 1, the detailed process of the method for transmitting data of hotspot cell coverage of an embodiment of the disclosure is as follows:

step a. a base station adjusts a MCS table allowing the same to satisfy a 256 QAM modulation scheme, and acquires layer 1 TBS when the modulation scheme is 256 QAM;

step b. on the basis of $N_{PRB}$, $I_{TBS}$ and the number of TB mapping layers, the base station determines the TBS currently transmitting data, and transmits data on the basis of the TBS.

In step a, on the basis of $N_{PRB}$ and $I_{TBS}$, taking $I_{TBS}$ as index row, taking $N_{PRB}$ as index column, the base station looks up the adjusted MCS table to acquire layer 1 TBS (including layer 1 TBS when the modulation scheme is 256 QAM). And layer 1 TBS when the modulation scheme is 256 QAM is acquired by adopting any one or several of the following ways:

Way a1, during hotspot cell coverage, the corresponding $I_{TBS}$ of the existing MCS table is appropriately adjusted, and the corresponding modulation scheme when the value of $I_{TBS}$ in the MCS table ranges from 23 to 26 is made to satisfy 256 QAM, wherein, levels of the $I_{TBS}$ level number is the same with levels of the existing standard (3GPP TS 36.213 V10.0.1). Specific method is as follows:

The corresponding TBS values when values of $I_{TBS}$ are 7, 13, 21 and 23 in TBS table of the corresponding $I_{TBS}$ of the existing MCS table are deleted, and then the corresponding TBS of the rest of $I_{TBS}$ to the corresponding TBS when value of $I_{TBS}$ ranges from 0 to 22 during hotspot cell coverage are mapped one by one; and the corresponding modulation scheme when value of $I_{TBS}$ ranges from 23 to 26 in MCS table is made to satisfy 256 QAM. The new adjusted MCS table is as shown in table below:

| New Adjusted MCS Table | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |
| 5 | 4 | 5 |
| 6 | 4 | 6 |
| 7 | 4 | 7 |
| 8 | 4 | 8 |
| 9 | 4 | 9 |
| 10 | 4 | 10 |
| 11 | 6 | 10 |
| 12 | 6 | 11 |
| 13 | 6 | 12 |
| 14 | 6 | 13 |
| 15 | 6 | 14 |
| 16 | 6 | 15 |
| 17 | 6 | 16 |
| 18 | 6 | 17 |
| 19 | 6 | 18 |
| 20 | 6 | 19 |
| 21 | 6 | 20 |
| 22 | 6 | 21 |
| 23 | 6 | 22 |
| 24 | 8 | 23 |
| 25 | 8 | 24 |
| 26 | 8 | 25 |
| 27 | 8 | 26 |
| 28 | 2 | reserved |
| 29 | 4 | |
| 30 | 6 | |
| 31 | 8 | |

By taking $I_{TBS}$ as index row and taking $N_{PRB}$ as index column, layer 1 TBS when the modulation scheme is 256 QAM is acquired by looking up the above MCS table.

Furthermore, the corresponding value of newly increased TBS when the value of $I_{TBS}$ ranges from 23 to 26 is acquired by adopting manners including any one or several of the following manners:

When $I_{TBS}$ is equal to 23, and $1 \leq N_{PRB} \leq 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 23 | 808 | 1608 | 2408 | 3240 | 4008 | 4968 | 5736 | 6456 | 7224 | 8248 |

When $I_{TBS}$ is equal to 23, and $11 \leq N_{PRB} \leq 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 23 | 9144 | 9912 | 10680 | 11448 | 12216 | 12960 | 14112 | 14688 | 15264 | 16416 |

When $I_{TBS}$ is equal to 23, and $21 \leq N_{PRB} \leq 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 23 | 16992 | 17568 | 19080 | 19848 | 20616 | 21384 | 22152 | 22920 | 23688 | 24496 |

When $I_{TBS}$ is equal to 23, and $31 \leq N_{PRB} \leq 40$, values of layer 1 TBS are as follows:

| | | | | | $N_{PRB}$ | | | | | |
|---|---|---|---|---|---|---|---|---|---|---|
| $I_{TBS}$ | 31 | 32 | 33 | 34 | 35 | 36 | 37 | 38 | 39 | 40 |
| 23 | 25456 | 26416 | 27376 | 27376 | 28336 | 29296 | 30576 | 30576 | 31704 | 32856 |

When $I_{TBS}$ is equal to 23, and $41 \leq N_{PRB} \leq 50$, values of layer 1 TBS are as follows:

| | | | | | $N_{PRB}$ | | | | | |
|---|---|---|---|---|---|---|---|---|---|---|
| $I_{TBS}$ | 41 | 42 | 43 | 44 | 45 | 46 | 47 | 48 | 49 | 50 |
| 23 | 34008 | 34008 | 35160 | 35160 | 36696 | 37888 | 37888 | 39232 | 40576 | 40576 |

When $I_{TBS}$ is equal to 23, and $51 \leq N_{PRB} \leq 60$, values of layer 1 TBS are as follows:

| | | | | | $N_{PRB}$ | | | | | |
|---|---|---|---|---|---|---|---|---|---|---|
| $I_{TBS}$ | 51 | 52 | 53 | 54 | 55 | 56 | 57 | 58 | 59 | 60 |
| 23 | 42368 | 42368 | 43816 | 43816 | 45352 | 45352 | 46888 | 46888 | 48936 | 48936 |

When $I_{TBS}$ is equal to 23, and $61 \leq N_{PRB} \leq 70$, values of layer 1 TBS are as follows:

| | | | | | $N_{PRB}$ | | | | | |
|---|---|---|---|---|---|---|---|---|---|---|
| $I_{TBS}$ | 61 | 62 | 63 | 64 | 65 | 66 | 67 | 68 | 69 | 70 |
| 23 | 48936 | 51024 | 51024 | 52752 | 52752 | 52752 | 55056 | 55056 | 57336 | 57336 |

When $I_{TBS}$ is equal to 23, and $71 \leq N_{PRB} \leq 80$, values of layer 1 TBS are as follows:

| | | | | | $N_{PRB}$ | | | | | |
|---|---|---|---|---|---|---|---|---|---|---|
| $I_{TBS}$ | 71 | 72 | 73 | 74 | 75 | 76 | 77 | 78 | 79 | 80 |
| 23 | 57336 | 59256 | 59256 | 59256 | 61664 | 61664 | 63776 | 63776 | 63776 | 66592 |

When $I_{TBS}$ is equal to 23, and $81 \leq N_{PRB} \leq 90$, values of layer 1 TBS are as follows:

| | | | | | $N_{PRB}$ | | | | | |
|---|---|---|---|---|---|---|---|---|---|---|
| $I_{TBS}$ | 81 | 82 | 83 | 84 | 85 | 86 | 87 | 88 | 89 | 90 |
| 23 | 66592 | 66592 | 68808 | 68808 | 68808 | 71112 | 71112 | 71112 | 73712 | 73712 |

When $I_{TBS}$ is equal to 23, and $91 \leq N_{PRB} \leq 100$, values of layer 1 TBS are as follows:

| | | | | | $N_{PRB}$ | | | | | |
|---|---|---|---|---|---|---|---|---|---|---|
| $I_{TBS}$ | 91 | 92 | 93 | 94 | 95 | 96 | 97 | 98 | 99 | 100 |
| 23 | 73712 | 75376 | 75376 | 75376 | 75376 | 75376 | 75376 | 75376 | 75376 | 75376 |

When $I_{TBS}$ is equal to 23, and $101 \le N_{PRB} \le 110$, values of layer 1 TBS are as follows:

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 23 | 81176 | 84760 | 84760 | 84760 | 84760 | 87936 | 87936 | 87936 | 87936 | 90816 |

When $I_{TBS}$ is equal to 24, and $1 \le N_{PRB} \le 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 24 | 872 | 1736 | 2600 | 3496 | 4392 | 5352 | 6200 | 6968 | 7992 | 8760 |

When $I_{TBS}$ is equal to 24, and $11 \le N_{PRB} \le 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 24 | 9528 | 10680 | 11448 | 12216 | 12960 | 14112 | 14688 | 15840 | 16416 | 17568 |

When $I_{TBS}$ is equal to 24, and $21 \le N_{PRB} \le 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 24 | 18336 | 19080 | 19848 | 21384 | 22152 | 22920 | 23688 | 24496 | 25456 | 26416 |

When $I_{TBS}$ is equal to 24, and $31 \le N_{PRB} \le 40$, values of layer 1 TBS are as follows:

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 24 | 27376 | 28336 | 29296 | 29296 | 30576 | 31704 | 32856 | 32856 | 34008 | 35160 |

When $I_{TBS}$ is equal to 24, and $41 \le N_{PRB} \le 50$, values of layer 1 TBS are as follows:

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 24 | 36696 | 36696 | 37888 | 39232 | 39232 | 40576 | 40576 | 42368 | 43816 | 43816 |

When $I_{TBS}$ is equal to 24, and $51 \le N_{PRB} \le 60$, values of layer 1 TBS are as follows:

| | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 24 | 45352 | 45352 | 46888 | 46888 | 48936 | 48936 | 51024 | 51024 | 52752 | 52752 |

When $I_{TBS}$ is equal to 24, and $61 \leq N_{PRB} \leq 70$, values of layer 1 TBS are as follows:

| | | | | $N_{PRB}$ | | | | | |
|---|---|---|---|---|---|---|---|---|---|
| $I_{TBS}$ | 61 | 62 | 63 | 64 | 65 | 66 | 67 | 68 | 69 | 70 |
| 24 | 52752 | 55056 | 55056 | 57336 | 57336 | 57336 | 59256 | 59256 | 61664 | 61664 |

When $I_{TBS}$ is equal to 24, and $71 \leq N_{PRB} \leq 80$, values of layer 1 TBS are as follows:

| | | | | $N_{PRB}$ | | | | | |
|---|---|---|---|---|---|---|---|---|---|
| $I_{TBS}$ | 71 | 72 | 73 | 74 | 75 | 76 | 77 | 78 | 79 | 80 |
| 24 | 61664 | 63776 | 63776 | 63776 | 66592 | 66592 | 68808 | 68808 | 68808 | 71112 |

When $I_{TBS}$ is equal to 24, and $81 \leq N_{PRB} \leq 90$, values of layer 1 TBS are as follows:

| | | | | $N_{PRB}$ | | | | | |
|---|---|---|---|---|---|---|---|---|---|
| $I_{TBS}$ | 81 | 82 | 83 | 84 | 85 | 86 | 87 | 88 | 89 | 90 |
| 24 | 71112 | 71112 | 73712 | 73712 | 75376 | 75376 | 76208 | 76208 | 78704 | 78704 |

When $I_{TBS}$ is equal to 24, and $91 \leq N_{PRB} \leq 100$, values of layer 1 TBS are as follows:

| | | | | $N_{PRB}$ | | | | | |
|---|---|---|---|---|---|---|---|---|---|
| $I_{TBS}$ | 91 | 92 | 93 | 94 | 95 | 96 | 97 | 98 | 99 | 100 |
| 24 | 81176 | 81176 | 81176 | 81176 | 84760 | 84760 | 84760 | 84760 | 87936 | 87936 |

When $I_{TBS}$ is equal to 24, and $101 \leq N_{PRB} \leq 110$, values of layer 1 TBS are as follows:

| | | | | $N_{PRB}$ | | | | | |
|---|---|---|---|---|---|---|---|---|---|
| $I_{TBS}$ | 101 | 102 | 103 | 104 | 105 | 106 | 107 | 108 | 109 | 110 |
| 24 | 87936 | 90816 | 90816 | 90816 | 93800 | 93800 | 93800 | 93800 | 97896 | 97896 |

When $I_{TBS}$ is equal to 25, and $1 \leq N_{PRB} \leq 10$, values of layer 1 TBS are as follows:

| | | | | $N_{PRB}$ | | | | | |
|---|---|---|---|---|---|---|---|---|---|
| $I_{TBS}$ | 1 | 2 | 3 | 4 | 5 | 6 | 7 | 8 | 9 | 10 |
| 25 | 936 | 1864 | 2792 | 3752 | 4776 | 5736 | 6456 | 7480 | 8504 | 9528 |

When $I_{TBS}$ is equal to 25, and $11 \leq N_{PRB} \leq 20$, values of layer 1 TBS are as follows:

| | | | | $N_{PRB}$ | | | | | |
|---|---|---|---|---|---|---|---|---|---|
| $I_{TBS}$ | 11 | 12 | 13 | 14 | 15 | 16 | 17 | 18 | 19 | 20 |
| 25 | 10296 | 11448 | 12216 | 12960 | 14112 | 15264 | 15840 | 16992 | 17568 | 19080 |

When $I_{TBS}$ is equal to 25, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 25 | 19848 | 20616 | 21384 | 22920 | 23688 | 24496 | 25456 | 26416 | 27376 | 28336 |

When $I_{TBS}$ is equal to 25, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 25 | 29296 | 30576 | 30576 | 31704 | 32856 | 34008 | 35160 | 35160 | 36696 | 37888 |

When $I_{TBS}$ is equal to 25, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 25 | 39232 | 39232 | 40576 | 42368 | 42368 | 43816 | 43816 | 45352 | 46888 | 46888 |

When $I_{TBS}$ is equal to 25, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 25 | 48936 | 48936 | 51024 | 51024 | 51024 | 52752 | 52752 | 55056 | 55056 | 57336 |

When $I_{TBS}$ is equal to 25, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 25 | 57336 | 59256 | 59256 | 59256 | 61664 | 61664 | 63776 | 63776 | 63776 | 66592 |

When $I_{TBS}$ is equal to 25, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 25 | 66592 | 68808 | 68808 | 68808 | 71112 | 71112 | 73712 | 73712 | 73712 | 75376 |

When $I_{TBS}$ is equal to 25, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 25 | 76208 | 76208 | 78704 | 78704 | 81176 | 81176 | 81176 | 84760 | 84760 | 84760 |

When $I_{TBS}$ is equal to 25, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 25 | 84760 | 87936 | 87936 | 87936 | 90816 | 90816 | 90816 | 93800 | 93800 | 93800 |

When $I_{TBS}$ is equal to 25, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 25 | 93800 | 97896 | 97896 | 97896 | 97896 | 101840 | 101840 | 101840 | 101840 | 105528 |

When $I_{TBS}$ is equal to 26, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 26 | 1000 | 1992 | 2984 | 4008 | 4968 | 5992 | 6968 | 7992 | 9144 | 9912 |

When $I_{TBS}$ is equal to 26, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 26 | 11064 | 12216 | 12960 | 14112 | 15264 | 15840 | 16992 | 18336 | 19080 | 19848 |

When $I_{TBS}$ is equal to 26, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 26 | 21384 | 22152 | 22920 | 24496 | 25456 | 26416 | 27376 | 28336 | 29296 | 30576 |

When $I_{TBS}$ is equal to 26, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 26 | 31704 | 31704 | 32856 | 34008 | 35160 | 36696 | 36696 | 37888 | 39232 | 40576 |

When $I_{TBS}$ is equal to 26, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 26 | 40576 | 42368 | 43816 | 43816 | 45352 | 46888 | 46888 | 48936 | 48936 | 51024 |

When $I_{TBS}$ is equal to 26, and $51 \leq N_{PRB} \leq 60$, values of layer 1 TBS are as follows:

| | $N_{PRB}$ | | | | | | | | |
|---|---|---|---|---|---|---|---|---|---|
| $I_{TBS}$ | 51 | 52 | 53 | 54 | 55 | 56 | 57 | 58 | 59 | 60 |
| 26 | 51024 | 52752 | 52752 | 55056 | 55056 | 57336 | 57336 | 59256 | 59256 | 59256 |

When $I_{TBS}$ is equal to 26, and $61 \leq N_{PRB} \leq 70$, values of layer 1 TBS are as follows:

| | $N_{PRB}$ | | | | | | | | |
|---|---|---|---|---|---|---|---|---|---|
| $I_{TBS}$ | 61 | 62 | 63 | 64 | 65 | 66 | 67 | 68 | 69 | 70 |
| 26 | 61664 | 61664 | 63776 | 63776 | 66592 | 66592 | 66592 | 68808 | 68808 | 71112 |

When $I_{TBS}$ is equal to 26, and $71 \leq N_{PRB} \leq 80$, values of layer 1 TBS are as follows:

| | $N_{PRB}$ | | | | | | | | |
|---|---|---|---|---|---|---|---|---|---|
| $I_{TBS}$ | 71 | 72 | 73 | 74 | 75 | 76 | 77 | 78 | 79 | 80 |
| 26 | 71112 | 73712 | 73712 | 73712 | 75376 | 76208 | 78704 | 78704 | 78704 | 81176 |

When $I_{TBS}$ is equal to 26, and $81 \leq N_{PRB} \leq 90$, values of layer 1 TBS are as follows:

| | $N_{PRB}$ | | | | | | | | |
|---|---|---|---|---|---|---|---|---|---|
| $I_{TBS}$ | 81 | 82 | 83 | 84 | 85 | 86 | 87 | 88 | 89 | 90 |
| 26 | 81176 | 81176 | 84760 | 84760 | 84760 | 87936 | 87936 | 87936 | 90816 | 90816 |

When $I_{TBS}$ is equal to 26, and $91 \leq N_{PRB} \leq 100$, values of layer 1 TBS are as follows:

| | $N_{PRB}$ | | | | | | | | |
|---|---|---|---|---|---|---|---|---|---|
| $I_{TBS}$ | 91 | 92 | 93 | 94 | 95 | 96 | 97 | 98 | 99 | 100 |
| 26 | 90816 | 93800 | 93800 | 93800 | 93800 | 97896 | 97896 | 97896 | 97896 | 101840 |

When $I_{TBS}$ is equal to 26, and $101 \leq N_{PRB} \leq 110$, values of layer 1 TBS are as follows:

| | $N_{PRB}$ | | | | | | | | |
|---|---|---|---|---|---|---|---|---|---|
| $I_{TBS}$ | 101 | 102 | 103 | 104 | 105 | 106 | 107 | 108 | 109 | 110 |
| 26 | 101840 | 101840 | 105528 | 105528 | 105528 | 105528 | 105528 | 110136 | 110136 | 110136 |

Way a2, during hotspot cell coverage, the corresponding ITBS of the existing MCS table are appropriately adjusted, and the corresponding modulation scheme when the value of ITBS ranges from 21 to 26 is made to satisfy 256 QAM, wherein, the $I_{TBS}$ level number is the same with levels of the existing standard. Specific method is as follows:

The corresponding TBS values when values of $I_{TBS}$ are 3, 7, 11, 13, 21 and 23 in TBS table of the corresponding $I_{TBS}$ of the existing MCS table are deleted, and then the corresponding TBS of the rest of $I_{TBS}$ to the corresponding TBS when value of $I_{TBS}$ ranges from 0 to 22 during hotspot cell coverage are mapped one by one; and the corresponding modulation scheme when value of $I_{TBS}$ ranges from 21 to 26 in MCS table is made to satisfy 256 QAM. The new adjusted MCS table is as shown in table below:

| New Adjusted MCS Table | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 4 | 3 |
| 4 | 4 | 4 |
| 5 | 4 | 5 |
| 6 | 4 | 6 |
| 7 | 4 | 7 |
| 8 | 4 | 8 |
| 9 | 6 | 8 |
| 10 | 6 | 9 |
| 11 | 6 | 10 |
| 12 | 6 | 11 |
| 13 | 6 | 12 |
| 14 | 6 | 13 |
| 15 | 6 | 14 |
| 16 | 6 | 15 |
| 17 | 6 | 16 |
| 18 | 6 | 17 |
| 19 | 6 | 18 |
| 20 | 6 | 19 |
| 21 | 6 | 20 |
| 22 | 8 | 21 |
| 23 | 8 | 22 |
| 24 | 8 | 23 |
| 25 | 8 | 24 |
| 26 | 8 | 25 |
| 27 | 8 | 26 |
| 28 | 2 | reserved |
| 29 | 4 | |
| 30 | 6 | |
| 31 | 8 | |

By taking $I_{TBS}$ as index row and taking $N_{PRB}$ as index column, layer 1 TBS when the modulation scheme is 256 QAM is acquired by looking up the above MCS table.

The corresponding value of newly increased TBS when the value of $I_{TBS}$ ranges from 21 to 26 are acquired by adopting manners including any one or several of the following manners:

When $I_{TBS}$ is equal to 21, and $1 \leq N_{PRB} \leq 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 21 | 776 | 1544 | 2344 | 3112 | 4008 | 4776 | 5544 | 6200 | 7224 | 7992 |

When $I_{TBS}$ is equal to 21, and $11 \leq N_{PRB} \leq 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 21 | 8760 | 9528 | 10296 | 11064 | 11832 | 12576 | 13536 | 14112 | 15264 | 15840 |

When $I_{TBS}$ is equal to 21, and $21 \leq N_{PRB} \leq 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 21 | 16416 | 17568 | 18336 | 19080 | 19848 | 20616 | 21384 | 22152 | 22920 | 23688 |

When $I_{TBS}$ is equal to 21, and $31 \leq N_{PRB} \leq 40$, values of layer 1 TBS are as follows:

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 21 | 24496 | 25456 | 26416 | 27376 | 27376 | 28336 | 29296 | 30576 | 30576 | 31704 |

When $I_{TBS}$ is equal to 21, and $41 \leq N_{PRB} \leq 50$, values of layer 1 TBS are as follows:

| | | | | $N_{PRB}$ | | | | | |
|---|---|---|---|---|---|---|---|---|---|
| $I_{TBS}$ | 41 | 42 | 43 | 44 | 45 | 46 | 47 | 48 | 49 | 50 |
| 21 | 32856 | 32856 | 34008 | 35160 | 35160 | 36696 | 37888 | 37888 | 39232 | 39232 |

When $I_{TBS}$ is equal to 21, and $51 \leq N_{PRB} \leq 60$, values of layer 1 TBS are as follows:

| | | | | $N_{PRB}$ | | | | | |
|---|---|---|---|---|---|---|---|---|---|
| $I_{TBS}$ | 51 | 52 | 53 | 54 | 55 | 56 | 57 | 58 | 59 | 60 |
| 21 | 40576 | 40576 | 42368 | 42368 | 43816 | 43816 | 45352 | 45352 | 46888 | 46888 |

When $I_{TBS}$ is equal to 21, and $61 \leq N_{PRB} \leq 70$, values of layer 1 TBS are as follows:

| | | | | $N_{PRB}$ | | | | | |
|---|---|---|---|---|---|---|---|---|---|
| $I_{TBS}$ | 61 | 62 | 63 | 64 | 65 | 66 | 67 | 68 | 69 | 70 |
| 21 | 48936 | 48936 | 51024 | 51024 | 51024 | 52752 | 52752 | 55056 | 55056 | 55056 |

When $I_{TBS}$ is equal to 21, and $71 \leq N_{PRB} \leq 80$, values of layer 1 TBS are as follows:

| | | | | $N_{PRB}$ | | | | | |
|---|---|---|---|---|---|---|---|---|---|
| $I_{TBS}$ | 71 | 72 | 73 | 74 | 75 | 76 | 77 | 78 | 79 | 80 |
| 21 | 57336 | 57336 | 57336 | 59256 | 59256 | 59256 | 61664 | 61664 | 63776 | 63776 |

When $I_{TBS}$ is equal to 21, and $81 \leq N_{PRB} \leq 90$, values of layer 1 TBS are as follows:

| | | | | $N_{PRB}$ | | | | | |
|---|---|---|---|---|---|---|---|---|---|
| $I_{TBS}$ | 81 | 82 | 83 | 84 | 85 | 86 | 87 | 88 | 89 | 90 |
| 21 | 63776 | 63776 | 66592 | 66592 | 66592 | 68808 | 68808 | 68808 | 71112 | 71112 |

When $I_{TBS}$ is equal to 21, and $91 \leq N_{PRB} \leq 100$, values of layer 1 TBS are as follows:

| | | | | $N_{PRB}$ | | | | | |
|---|---|---|---|---|---|---|---|---|---|
| $I_{TBS}$ | 91 | 92 | 93 | 94 | 95 | 96 | 97 | 98 | 99 | 100 |
| 21 | 71112 | 73712 | 73712 | 75376 | 75376 | 76208 | 76208 | 78704 | 78704 | 78704 |

When $I_{TBS}$ is equal to 21, and $101 \leq N_{PRB} \leq 110$, values of layer 1 TBS are as follows:

| | | | | $N_{PRB}$ | | | | | |
|---|---|---|---|---|---|---|---|---|---|
| $I_{TBS}$ | 101 | 102 | 103 | 104 | 105 | 106 | 107 | 108 | 109 | 110 |
| 21 | 81176 | 81176 | 81176 | 81176 | 84760 | 84760 | 84760 | 84760 | 87936 | 87936 |

When $I_{TBS}$ is equal to 22, and $1 \leq N_{PRB} \leq 10$, values of layer 1 TBS are as follows:

| | | | | | $N_{PRB}$ | | | | | |
|---|---|---|---|---|---|---|---|---|---|---|
| $I_{TBS}$ | 1 | 2 | 3 | 4 | 5 | 6 | 7 | 8 | 9 | 10 |
| 22 | 808 | 1672 | 2472 | 3368 | 4136 | 4968 | 5736 | 6712 | 7480 | 8248 |

When $I_{TBS}$ is equal to 22, and $11 \leq N_{PRB} \leq 20$, values of layer 1 TBS are as follows:

| | | | | | $N_{PRB}$ | | | | | |
|---|---|---|---|---|---|---|---|---|---|---|
| $I_{TBS}$ | 11 | 12 | 13 | 14 | 15 | 16 | 17 | 18 | 19 | 20 |
| 22 | 9144 | 9912 | 10680 | 11832 | 12576 | 13536 | 14112 | 15264 | 15840 | 16992 |

When $I_{TBS}$ is equal to 22, and $21 \leq N_{PRB} \leq 30$, values of layer 1 TBS are as follows:

| | | | | | $N_{PRB}$ | | | | | |
|---|---|---|---|---|---|---|---|---|---|---|
| $I_{TBS}$ | 21 | 22 | 23 | 24 | 25 | 26 | 27 | 28 | 29 | 30 |
| 22 | 17568 | 18336 | 19080 | 19848 | 20616 | 21384 | 22920 | 23688 | 24496 | 25456 |

When $I_{TBS}$ is equal to 22, and $31 \leq N_{PRB} \leq 40$, values of layer 1 TBS are as follows:

| | | | | | $N_{PRB}$ | | | | | |
|---|---|---|---|---|---|---|---|---|---|---|
| $I_{TBS}$ | 31 | 32 | 33 | 34 | 35 | 36 | 37 | 38 | 39 | 40 |
| 22 | 25456 | 26416 | 27376 | 28336 | 29296 | 30576 | 30576 | 31704 | 32856 | 34008 |

When $I_{TBS}$ is equal to 22, and $41 \leq N_{PRB} \leq 50$, values of layer 1 TBS are as follows:

| | | | | | $N_{PRB}$ | | | | | |
|---|---|---|---|---|---|---|---|---|---|---|
| $I_{TBS}$ | 41 | 42 | 43 | 44 | 45 | 46 | 47 | 48 | 49 | 50 |
| 22 | 34008 | 35160 | 36696 | 36696 | 37888 | 37888 | 39232 | 40576 | 40576 | 42368 |

When $I_{TBS}$ is equal to 22, and $51 \leq N_{PRB} \leq 60$, values of layer 1 TBS are as follows:

| | | | | | $N_{PRB}$ | | | | | |
|---|---|---|---|---|---|---|---|---|---|---|
| $I_{TBS}$ | 51 | 52 | 53 | 54 | 55 | 56 | 57 | 58 | 59 | 60 |
| 22 | 42368 | 43816 | 43816 | 45352 | 45352 | 46888 | 46888 | 48936 | 48936 | 51024 |

When $I_{TBS}$ is equal to 22, and $61 \leq N_{PRB} \leq 70$, values of layer 1 TBS are as follows:

| | | | | | $N_{PRB}$ | | | | | |
|---|---|---|---|---|---|---|---|---|---|---|
| $I_{TBS}$ | 61 | 62 | 63 | 64 | 65 | 66 | 67 | 68 | 69 | 70 |
| 22 | 51024 | 51024 | 52752 | 52752 | 55056 | 55056 | 55056 | 57336 | 57336 | 59256 |

When $I_{TBS}$ is equal to 22, and $71 \leq N_{PRB} \leq 80$, values of layer 1 TBS are as follows:

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 22 | 59256 | 59256 | 61664 | 61664 | 63776 | 63776 | 63776 | 66592 | 66592 | 66592 |

When $I_{TBS}$ is equal to 22, and $81 \leq N_{PRB} \leq 90$, values of layer 1 TBS are as follows:

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 22 | 68808 | 68808 | 68808 | 71112 | 71112 | 71112 | 73712 | 73712 | 73712 | 75376 |

When $I_{TBS}$ is equal to 22, and $91 \leq N_{PRB} \leq 100$, values of layer 1 TBS are as follows:

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 22 | 76208 | 76208 | 78704 | 78704 | 78704 | 81176 | 81176 | 81176 | 81176 | 84760 |

When $I_{TBS}$ is equal to 22, and $101 \leq N_{PRB} \leq 110$, values of layer 1 TBS are as follows:

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 22 | 84760 | 84760 | 84760 | 87936 | 87936 | 87936 | 90816 | 90816 | 90816 | 90816 |

When $I_{TBS}$ is equal to 23, and $1 \leq N_{PRB} \leq 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 23 | 872 | 1736 | 2600 | 3496 | 4392 | 5352 | 6200 | 6968 | 7992 | 8760 |

When $I_{TBS}$ is equal to 23, and $11 \leq N_{PRB} \leq 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 23 | 9528 | 10680 | 11448 | 12216 | 12960 | 14112 | 14688 | 15840 | 16416 | 17568 |

When $I_{TBS}$ is equal to 23, and $21 \leq N_{PRB} \leq 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 23 | 18336 | 19080 | 19848 | 21384 | 22152 | 22920 | 23688 | 24496 | 25456 | 26416 |

When $I_{TBS}$ is equal to 23, and $31 \leq N_{PRB} \leq 40$, values of layer 1 TBS are as follows:

| | | | | $N_{PRB}$ | | | | | |
|---|---|---|---|---|---|---|---|---|---|
| $I_{TBS}$ | 31 | 32 | 33 | 34 | 35 | 36 | 37 | 38 | 39 | 40 |
| 23 | 27376 | 28336 | 29296 | 29296 | 30576 | 31704 | 32856 | 32856 | 34008 | 35160 |

When $I_{TBS}$ is equal to 23, and $41 \leq N_{PRB} \leq 50$, values of layer 1 TBS are as follows:

| | | | | $N_{PRB}$ | | | | | |
|---|---|---|---|---|---|---|---|---|---|
| $I_{TBS}$ | 41 | 42 | 43 | 44 | 45 | 46 | 47 | 48 | 49 | 50 |
| 23 | 36696 | 36696 | 37888 | 39232 | 39232 | 40576 | 40576 | 42368 | 43816 | 43816 |

When $I_{TBS}$ is equal to 23, and $51 \leq N_{PRB} \leq 60$, values of layer 1 TBS are as follows:

| | | | | $N_{PRB}$ | | | | | |
|---|---|---|---|---|---|---|---|---|---|
| $I_{TBS}$ | 51 | 52 | 53 | 54 | 55 | 56 | 57 | 58 | 59 | 60 |
| 23 | 45352 | 45352 | 46888 | 46888 | 48936 | 48936 | 51024 | 51024 | 52752 | 52752 |

When $I_{TBS}$ is equal to 23, and $61 \leq N_{PRB} \leq 70$, values of layer 1 TBS are as follows:

| | | | | $N_{PRB}$ | | | | | |
|---|---|---|---|---|---|---|---|---|---|
| $I_{TBS}$ | 61 | 62 | 63 | 64 | 65 | 66 | 67 | 68 | 69 | 70 |
| 23 | 52752 | 55056 | 55056 | 57336 | 57336 | 57336 | 59256 | 59256 | 61664 | 61664 |

When $I_{TBS}$ is equal to 23, and $71 \leq N_{PRB} \leq 80$, values of layer 1 TBS are as follows:

| | | | | $N_{PRB}$ | | | | | |
|---|---|---|---|---|---|---|---|---|---|
| $I_{TBS}$ | 71 | 72 | 73 | 74 | 75 | 76 | 77 | 78 | 79 | 80 |
| 23 | 61664 | 63776 | 63776 | 63776 | 66592 | 66592 | 68808 | 68808 | 68808 | 71112 |

When $I_{TBS}$ is equal to 23, and $81 \leq N_{PRB} \leq 90$, values of layer 1 TBS are as follows:

| | | | | $N_{PRB}$ | | | | | |
|---|---|---|---|---|---|---|---|---|---|
| $I_{TBS}$ | 81 | 82 | 83 | 84 | 85 | 86 | 87 | 88 | 89 | 90 |
| 23 | 71112 | 71112 | 73712 | 73712 | 75376 | 75376 | 76208 | 76208 | 78704 | 78704 |

When $I_{TBS}$ is equal to 23, and $91 \leq N_{PRB} \leq 100$, values of layer 1 TBS are as follows:

| | | | | $N_{PRB}$ | | | | | |
|---|---|---|---|---|---|---|---|---|---|
| $I_{TBS}$ | 91 | 92 | 93 | 94 | 95 | 96 | 97 | 98 | 99 | 100 |
| 23 | 81176 | 81176 | 81176 | 81176 | 84760 | 84760 | 84760 | 84760 | 87936 | 87936 |

When $I_{TBS}$ is equal to 23, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 23 | 87936 | 90816 | 90816 | 90816 | 93800 | 93800 | 93800 | 93800 | 97896 | 97896 |

When $I_{TBS}$ is equal to 24, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 24 | 904 | 1800 | 2728 | 3624 | 4584 | 5544 | 6456 | 7224 | 8248 | 9144 |

When $I_{TBS}$ is equal to 24, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 24 | 10296 | 11064 | 11832 | 12960 | 13536 | 14688 | 15840 | 16416 | 17568 | 18336 |

When $I_{TBS}$ is equal to 24, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 24 | 19080 | 20616 | 21384 | 22152 | 22920 | 23688 | 24496 | 25456 | 26416 | 27376 |

When $I_{TBS}$ is equal to 24, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 24 | 28336 | 29296 | 30576 | 31704 | 31704 | 32856 | 34008 | 35160 | 36696 | 36696 |

When $I_{TBS}$ is equal to 24, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 24 | 37888 | 39232 | 39232 | 40576 | 42368 | 42368 | 43816 | 43816 | 45352 | 45352 |

When $I_{TBS}$ is equal to 24, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 24 | 46888 | 48936 | 48936 | 48936 | 51024 | 51024 | 52752 | 52752 | 55056 | 55056 |

When $I_{TBS}$ is equal to 24, and $61 \leq N_{PRB} \leq 70$, values of layer 1 TBS are as follows:

| | | | | | $N_{PRB}$ | | | | | |
|---|---|---|---|---|---|---|---|---|---|---|
| $I_{TBS}$ | 61 | 62 | 63 | 64 | 65 | 66 | 67 | 68 | 69 | 70 |
| 24 | 57336 | 57336 | 57336 | 59256 | 59256 | 61664 | 61664 | 61664 | 63776 | 63776 |

When $I_{TBS}$ is equal to 24, and $71 \leq N_{PRB} \leq 80$, values of layer 1 TBS are as follows:

| | | | | | $N_{PRB}$ | | | | | |
|---|---|---|---|---|---|---|---|---|---|---|
| $I_{TBS}$ | 71 | 72 | 73 | 74 | 75 | 76 | 77 | 78 | 79 | 80 |
| 24 | 66592 | 66592 | 66592 | 68808 | 68808 | 71112 | 71112 | 71112 | 73712 | 73712 |

When $I_{TBS}$ is equal to 24, and $81 \leq N_{PRB} \leq 90$, values of layer 1 TBS are as follows:

| | | | | | $N_{PRB}$ | | | | | |
|---|---|---|---|---|---|---|---|---|---|---|
| $I_{TBS}$ | 81 | 82 | 83 | 84 | 85 | 86 | 87 | 88 | 89 | 90 |
| 24 | 75376 | 75376 | 76208 | 78704 | 78704 | 78704 | 81176 | 81176 | 81176 | 84760 |

When $I_{TBS}$ is equal to 24, and $91 \leq N_{PRB} \leq 100$, values of layer 1 TBS are as follows:

| | | | | | $N_{PRB}$ | | | | | |
|---|---|---|---|---|---|---|---|---|---|---|
| $I_{TBS}$ | 91 | 92 | 93 | 94 | 95 | 96 | 97 | 98 | 99 | 100 |
| 24 | 84760 | 84760 | 84760 | 87936 | 87936 | 87936 | 90816 | 90816 | 90816 | 90816 |

When $I_{TBS}$ is equal to 24, and $101 \leq N_{PRB} \leq 110$, values of layer 1 TBS are as follows:

| | | | | | $N_{PRB}$ | | | | | |
|---|---|---|---|---|---|---|---|---|---|---|
| $I_{TBS}$ | 101 | 102 | 103 | 104 | 105 | 106 | 107 | 108 | 109 | 110 |
| 24 | 93800 | 93800 | 93800 | 97896 | 97896 | 97896 | 97896 | 97896 | 101840 | 101840 |

When $I_{TBS}$ is equal to 25, and $1 \leq N_{PRB} \leq 10$, values of layer 1 TBS are as follows:

| | | | | | $N_{PRB}$ | | | | | |
|---|---|---|---|---|---|---|---|---|---|---|
| $I_{TBS}$ | 1 | 2 | 3 | 4 | 5 | 6 | 7 | 8 | 9 | 10 |
| 25 | 936 | 1928 | 2856 | 3880 | 4776 | 5736 | 6712 | 7736 | 8760 | 9528 |

When $I_{TBS}$ is equal to 25, and $11 \leq N_{PRB} \leq 20$, values of layer 1 TBS are as follows:

| | | | | | $N_{PRB}$ | | | | | |
|---|---|---|---|---|---|---|---|---|---|---|
| $I_{TBS}$ | 11 | 12 | 13 | 14 | 15 | 16 | 17 | 18 | 19 | 20 |
| 25 | 10680 | 11448 | 12576 | 13536 | 14688 | 15264 | 16416 | 17568 | 18336 | 19080 |

When $I_{TBS}$ is equal to 25, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 25 | 19848 | 21384 | 22152 | 22920 | 24496 | 25456 | 26416 | 27376 | 28336 | 29296 |

When $I_{TBS}$ is equal to 25, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 25 | 29296 | 30576 | 31704 | 32856 | 34008 | 35160 | 35160 | 36696 | 37888 | 39232 |

When $I_{TBS}$ is equal to 25, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 25 | 39232 | 40576 | 42368 | 42368 | 43816 | 43816 | 45352 | 46888 | 46888 | 48936 |

When $I_{TBS}$ is equal to 25, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 25 | 48936 | 51024 | 51024 | 52752 | 52752 | 55056 | 55056 | 55056 | 57336 | 57336 |

When $I_{TBS}$ is equal to 25, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 25 | 59256 | 59256 | 61664 | 61664 | 61664 | 63776 | 63776 | 66592 | 66592 | 66592 |

When $I_{TBS}$ is equal to 25, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 25 | 68808 | 68808 | 71112 | 71112 | 71112 | 73712 | 73712 | 75376 | 76208 | 76208 |

When $I_{TBS}$ is equal to 25, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 25 | 78704 | 78704 | 81176 | 81176 | 81176 | 84760 | 84760 | 84760 | 84760 | 87936 |

When $I_{TBS}$ is equal to 25, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 25 | 87936 | 87936 | 90816 | 90816 | 90816 | 93800 | 93800 | 93800 | 93800 | 97896 |

When $I_{TBS}$ is equal to 25, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 25 | 97896 | 97896 | 97896 | 101840 | 101840 | 101840 | 101840 | 105528 | 105528 | 105528 |

When $I_{TBS}$ is equal to 26, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 26 | 1000 | 1992 | 2984 | 4008 | 4968 | 5992 | 6968 | 7992 | 9144 | 9912 |

When $I_{TBS}$ is equal to 26, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 26 | 11064 | 12216 | 12960 | 14112 | 15264 | 15840 | 16992 | 18336 | 19080 | 19848 |

When $I_{TBS}$ is equal to 26, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 26 | 21384 | 22152 | 22920 | 24496 | 25456 | 26416 | 27376 | 28336 | 29296 | 30576 |

When $I_{TBS}$ is equal to 26, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 26 | 31704 | 31704 | 32856 | 34008 | 35160 | 36696 | 36696 | 37888 | 39232 | 40576 |

When $I_{TBS}$ is equal to 26, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 26 | 40576 | 42368 | 43816 | 43816 | 45352 | 46888 | 46888 | 48936 | 48936 | 51024 |

When $I_{TBS}$ is equal to 26, and $51 \leq N_{PRB} \leq 60$, values of layer 1 TBS are as follows:

| | $N_{PRB}$ | | | | | | | | |
|---|---|---|---|---|---|---|---|---|---|
| $I_{TBS}$ | 51 | 52 | 53 | 54 | 55 | 56 | 57 | 58 | 59 | 60 |
| 26 | 51024 | 52752 | 52752 | 55056 | 55056 | 57336 | 57336 | 59256 | 59256 | 59256 |

When $I_{TBS}$ is equal to 26, and $61 \leq N_{PRB} \leq 70$, values of layer 1 TBS are as follows:

| | $N_{PRB}$ | | | | | | | | |
|---|---|---|---|---|---|---|---|---|---|
| $I_{TBS}$ | 61 | 62 | 63 | 64 | 65 | 66 | 67 | 68 | 69 | 70 |
| 26 | 61664 | 61664 | 63776 | 63776 | 66592 | 66592 | 66592 | 68808 | 68808 | 71112 |

When $I_{TBS}$ is equal to 26, and $71 \leq N_{PRB} \leq 80$, values of layer 1 TBS are as follows:

| | $N_{PRB}$ | | | | | | | | |
|---|---|---|---|---|---|---|---|---|---|
| $I_{TBS}$ | 71 | 72 | 73 | 74 | 75 | 76 | 77 | 78 | 79 | 80 |
| 26 | 71112 | 73712 | 73712 | 73712 | 75376 | 76208 | 78704 | 78704 | 78704 | 81176 |

When $I_{TBS}$ is equal to 26, and $81 \leq N_{PRB} \leq 90$, values of layer 1 TBS are as follows:

| | $N_{PRB}$ | | | | | | | | |
|---|---|---|---|---|---|---|---|---|---|
| $I_{TBS}$ | 81 | 82 | 83 | 84 | 85 | 86 | 87 | 88 | 89 | 90 |
| 26 | 81176 | 81176 | 84760 | 84760 | 84760 | 87936 | 87936 | 87936 | 90816 | 90816 |

When $I_{TBS}$ is equal to 26, and $91 \leq N_{PRB} \leq 100$, values of layer 1 TBS are as follows:

| | $N_{PRB}$ | | | | | | | | |
|---|---|---|---|---|---|---|---|---|---|
| $I_{TBS}$ | 91 | 92 | 93 | 94 | 95 | 96 | 97 | 98 | 99 | 100 |
| 26 | 90816 | 93800 | 93800 | 93800 | 93800 | 97896 | 97896 | 97896 | 97896 | 101840 |

When $I_{TBS}$ is equal to 26, and $101 \leq N_{PRB} \leq 110$, values of layer 1 TBS are as follows:

| | $N_{PRB}$ | | | | | | | | |
|---|---|---|---|---|---|---|---|---|---|
| $I_{TBS}$ | 101 | 102 | 103 | 104 | 105 | 106 | 107 | 108 | 109 | 110 |
| 26 | 101840 | 101840 | 105528 | 105528 | 105528 | 105528 | 105528 | 110136 | 110136 | 110136 |

Way a3, during hotspot cell coverage, the corresponding ITBS of the existing MCS table are appropriately adjusted, and the corresponding modulation scheme when the value of $I_{TBS}$ in the MCS table ranges from 27 to 30 is made to satisfy 256 QAM, wherein, the $I_{TBS}$ level number increases four levels than the existing standard. Specific method is as follows:

The existing standard TBS table is increased for four levels, with the corresponding level number in the existing MCS table increasing four levels accordingly, the value of new MCS ranging from 27 to 30, and the corresponding modulation scheme when value of $I_{TBS}$ ranges from 27 to 30 in MCS table is made to satisfy 256 QAM. The new adjusted MCS table is as shown in table below:

New Adjusted MCS Table

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |

-continued

New Adjusted MCS Table

| MCS Index $I_{MCS}$ | Modulation Order $Q_m$ | TBS Index $I_{TBS}$ |
|---|---|---|
| 27 | 6 | 25 |
| 28 | 6 | 26 |
| 29 | 2 | reserved |
| 30 | 4 | |
| 31 | 6 | |
| 32 | 8 | 26 |
| 33 | 8 | 27 |
| 34 | 8 | 28 |
| 35 | 8 | 29 |
| 36 | 8 | 30 |
| 37 | 8 | reserved |

By taking $I_{TBS}$ as index row and taking $N_{PRB}$ as index column, layer 1 TBS when the modulation scheme is 256 QAM is acquired by looking up the above MCS table.

The corresponding value of newly increased TBS when the value of $I_{TBS}$ ranges from 27 to 30 is acquired by adopting manners including any one or several of the following manners:

When $I_{TBS}$ is equal to 27, and $1 \leq N_{PRB} \leq 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 27 | 808 | 1608 | 2408 | 3240 | 4008 | 4968 | 5736 | 6456 | 7224 | 8248 |

When $I_{TBS}$ is equal to 27, and $11 \leq N_{PRB} \leq 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 27 | 9144 | 9912 | 10680 | 11448 | 12216 | 12960 | 14112 | 14688 | 15264 | 16416 |

When $I_{TBS}$ is equal to 27, and $21 \leq N_{PRB} \leq 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 27 | 16992 | 17568 | 19080 | 19848 | 20616 | 21384 | 22152 | 22920 | 23688 | 24496 |

When $I_{TBS}$ is equal to 27, and $31 \leq N_{PRB} \leq 40$, values of layer 1 TBS are as follows:

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 27 | 25456 | 26416 | 27376 | 27376 | 28336 | 29296 | 30576 | 30576 | 31704 | 32856 |

When $I_{TBS}$ is equal to 27, and $41 \leq N_{PRB} \leq 50$, values of layer 1 TBS are as follows:

|  | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 27 | 34008 | 34008 | 35160 | 35160 | 36696 | 37888 | 37888 | 39232 | 40576 | 40576 |

When $I_{TBS}$ is equal to 27, and $51 \leq N_{PRB} \leq 60$, values of layer 1 TBS are as follows:

|  | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 27 | 42368 | 42368 | 43816 | 43816 | 45352 | 45352 | 46888 | 46888 | 48936 | 48936 |

When $I_{TBS}$ is equal to 27, and $61 \leq N_{PRB} \leq 70$, values of layer 1 TBS are as follows:

|  | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 27 | 48936 | 51024 | 51024 | 52752 | 52752 | 52752 | 55056 | 55056 | 57336 | 57336 |

When $I_{TBS}$ is equal to 27, and $71 \leq N_{PRB} \leq 80$, values of layer 1 TBS are as follows:

|  | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 27 | 57336 | 59256 | 59256 | 59256 | 61664 | 61664 | 63776 | 63776 | 63776 | 66592 |

When $I_{TBS}$ is equal to 27, and $81 \leq N_{PRB} \leq 90$, values of layer 1 TBS are as follows:

|  | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 27 | 66592 | 66592 | 68808 | 68808 | 68808 | 71112 | 71112 | 71112 | 73712 | 73712 |

When $I_{TBS}$ is equal to 27, and $91 \leq N_{PRB} \leq 100$, values of layer 1 TBS are as follows:

|  | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 27 | 73712 | 75376 | 75376 | 75376 | 75376 | 75376 | 75376 | 75376 | 75376 | 75376 |

When $I_{TBS}$ is equal to 27, and $101 \leq N_{PRB} \leq 110$, values of layer 1 TBS are as follows:

|  | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 27 | 81176 | 84760 | 84760 | 84760 | 84760 | 87936 | 87936 | 87936 | 87936 | 90816 |

When $I_{TBS}$ is equal to 28, and $1 \leq N_{PRB} \leq 10$, values of layer 1 TBS are as follows:

| | | | | $N_{PRB}$ | | | | | |
|---|---|---|---|---|---|---|---|---|---|
| $I_{TBS}$ | 1 | 2 | 3 | 4 | 5 | 6 | 7 | 8 | 9 | 10 |
| 28 | 872 | 1736 | 2600 | 3496 | 4392 | 5352 | 6200 | 6968 | 7992 | 8760 |

When $I_{TBS}$ is equal to 28, and $11 \leq N_{PRB} \leq 20$, values of layer 1 TBS are as follows:

| | | | | $N_{PRB}$ | | | | | |
|---|---|---|---|---|---|---|---|---|---|
| $I_{TBS}$ | 11 | 12 | 13 | 14 | 15 | 16 | 17 | 18 | 19 | 20 |
| 28 | 9528 | 10680 | 11448 | 12216 | 12960 | 14112 | 14688 | 15840 | 16416 | 17568 |

When $I_{TBS}$ is equal to 28, and $21 \leq N_{PRB} \leq 30$, values of layer 1 TBS are as follows:

| | | | | $N_{PRB}$ | | | | | |
|---|---|---|---|---|---|---|---|---|---|
| $I_{TBS}$ | 21 | 22 | 23 | 24 | 25 | 26 | 27 | 28 | 29 | 30 |
| 28 | 18336 | 19080 | 19848 | 21384 | 22152 | 22920 | 23688 | 24496 | 25456 | 26416 |

When $I_{TBS}$ is equal to 28, and $31 \leq N_{PRB} \leq 40$, values of layer 1 TBS are as follows:

| | | | | $N_{PRB}$ | | | | | |
|---|---|---|---|---|---|---|---|---|---|
| $I_{TBS}$ | 31 | 32 | 33 | 34 | 35 | 36 | 37 | 38 | 39 | 40 |
| 28 | 27376 | 28336 | 29296 | 29296 | 30576 | 31704 | 32856 | 32856 | 34008 | 35160 |

When $I_{TBS}$ is equal to 28, and $41 \leq N_{PRB} \leq 50$, values of layer 1 TBS are as follows:

| | | | | $N_{PRB}$ | | | | | |
|---|---|---|---|---|---|---|---|---|---|
| $I_{TBS}$ | 41 | 42 | 43 | 44 | 45 | 46 | 47 | 48 | 49 | 50 |
| 28 | 36696 | 36696 | 37888 | 39232 | 39232 | 40576 | 40576 | 42368 | 43816 | 43816 |

When $I_{TBS}$ is equal to 28, and $51 \leq N_{PRB} \leq 60$, values of layer 1 TBS are as follows:

| | | | | $N_{PRB}$ | | | | | |
|---|---|---|---|---|---|---|---|---|---|
| $I_{TBS}$ | 51 | 52 | 53 | 54 | 55 | 56 | 57 | 58 | 59 | 60 |
| 28 | 45352 | 45352 | 46888 | 46888 | 48936 | 48936 | 51024 | 51024 | 52752 | 52752 |

When $I_{TBS}$ is equal to 28, and $61 \leq N_{PRB} \leq 70$, values of layer 1 TBS are as follows:

| | | | | $N_{PRB}$ | | | | | |
|---|---|---|---|---|---|---|---|---|---|
| $I_{TBS}$ | 61 | 62 | 63 | 64 | 65 | 66 | 67 | 68 | 69 | 70 |
| 28 | 52752 | 55056 | 55056 | 57336 | 57336 | 57336 | 59256 | 59256 | 61664 | 61664 |

When $I_{TBS}$ is equal to 28, and $71 \leq N_{PRB} \leq 80$, values of layer 1 TBS are as follows:

| | $N_{PRB}$ | | | | | | | | |
|---|---|---|---|---|---|---|---|---|---|
| $I_{TBS}$ | 71 | 72 | 73 | 74 | 75 | 76 | 77 | 78 | 79 | 80 |
| 28 | 61664 | 63776 | 63776 | 63776 | 66592 | 66592 | 68808 | 68808 | 68808 | 71112 |

When $I_{TBS}$ is equal to 28, and $81 \leq N_{PRB} \leq 90$, values of layer 1 TBS are as follows:

| | $N_{PRB}$ | | | | | | | | |
|---|---|---|---|---|---|---|---|---|---|
| $I_{TBS}$ | 81 | 82 | 83 | 84 | 85 | 86 | 87 | 88 | 89 | 90 |
| 28 | 71112 | 71112 | 73712 | 73712 | 75376 | 75376 | 76208 | 76208 | 78704 | 78704 |

When $I_{TBS}$ is equal to 28, and $91 \leq N_{PRB} \leq 100$, values of layer 1 TBS are as follows:

| | $N_{PRB}$ | | | | | | | | |
|---|---|---|---|---|---|---|---|---|---|
| $I_{TBS}$ | 91 | 92 | 93 | 94 | 95 | 96 | 97 | 98 | 99 | 100 |
| 28 | 81176 | 81176 | 81176 | 81176 | 84760 | 84760 | 84760 | 84760 | 87936 | 87936 |

When $I_{TBS}$ is equal to 28, and $101 \leq N_{PRB} \leq 110$, values of layer 1 TBS are as follows:

| | $N_{PRB}$ | | | | | | | | |
|---|---|---|---|---|---|---|---|---|---|
| $I_{TBS}$ | 101 | 102 | 103 | 104 | 105 | 106 | 107 | 108 | 109 | 110 |
| 28 | 87936 | 90816 | 90816 | 90816 | 93800 | 93800 | 93800 | 93800 | 97896 | 97896 |

When $I_{TBS}$ is equal to 29, and $1 \leq N_{PRB} \leq 10$, values of layer 1 TBS are as follows:

| | $N_{PRB}$ | | | | | | | | |
|---|---|---|---|---|---|---|---|---|---|
| $I_{TBS}$ | 1 | 2 | 3 | 4 | 5 | 6 | 7 | 8 | 9 | 10 |
| 29 | 936 | 1864 | 2792 | 3752 | 4776 | 5736 | 6456 | 7480 | 8504 | 9528 |

When $I_{TBS}$ is equal to 29, and $11 \leq N_{PRB} \leq 20$, values of layer 1 TBS are as follows:

| | $N_{PRB}$ | | | | | | | | |
|---|---|---|---|---|---|---|---|---|---|
| $I_{TBS}$ | 11 | 12 | 13 | 14 | 15 | 16 | 17 | 18 | 19 | 20 |
| 29 | 10296 | 11448 | 12216 | 12960 | 14112 | 15264 | 15840 | 16992 | 17568 | 19080 |

When $I_{TBS}$ is equal to 29, and $21 \leq N_{PRB} \leq 30$, values of layer 1 TBS are as follows:

| | $N_{PRB}$ | | | | | | | | |
|---|---|---|---|---|---|---|---|---|---|
| $I_{TBS}$ | 21 | 22 | 23 | 24 | 25 | 26 | 27 | 28 | 29 | 30 |
| 29 | 19848 | 20616 | 21384 | 22920 | 23688 | 24496 | 25456 | 26416 | 27376 | 28336 |

When $I_{TBS}$ is equal to 29, and $31 \leq N_{PRB} \leq 40$, values of layer 1 TBS are as follows:

| $I_{TBS}$ | \multicolumn{10}{c}{$N_{PRB}$} |
|---|---|---|---|---|---|---|---|---|---|---|
|  | 31 | 32 | 33 | 34 | 35 | 36 | 37 | 38 | 39 | 40 |
| 29 | 29296 | 30576 | 30576 | 31704 | 32856 | 34008 | 35160 | 35160 | 36696 | 37888 |

When $I_{TBS}$ is equal to 29, and $41 \leq N_{PRB} \leq 50$, values of layer 1 TBS are as follows:

| $I_{TBS}$ | \multicolumn{10}{c}{$N_{PRB}$} |
|---|---|---|---|---|---|---|---|---|---|---|
|  | 41 | 42 | 43 | 44 | 45 | 46 | 47 | 48 | 49 | 50 |
| 29 | 39232 | 39232 | 40576 | 42368 | 42368 | 43816 | 43816 | 45352 | 46888 | 46888 |

When $I_{TBS}$ is equal to 29, and $51 \leq N_{PRB} \leq 60$, values of layer 1 TBS are as follows:

| $I_{TBS}$ | \multicolumn{10}{c}{$N_{PRB}$} |
|---|---|---|---|---|---|---|---|---|---|---|
|  | 51 | 52 | 53 | 54 | 55 | 56 | 57 | 58 | 59 | 60 |
| 29 | 48936 | 48936 | 51024 | 51024 | 51024 | 52752 | 52752 | 55056 | 55056 | 57336 |

When $I_{TBS}$ is equal to 29, and $61 \leq N_{PRB} \leq 70$, values of layer 1 TBS are as follows:

| $I_{TBS}$ | \multicolumn{10}{c}{$N_{PRB}$} |
|---|---|---|---|---|---|---|---|---|---|---|
|  | 61 | 62 | 63 | 64 | 65 | 66 | 67 | 68 | 69 | 70 |
| 29 | 57336 | 59256 | 59256 | 59256 | 61664 | 61664 | 63776 | 63776 | 63776 | 66592 |

When $I_{TBS}$ is equal to 29, and $71 \leq N_{PRB} \leq 80$, values of layer 1 TBS are as follows:

| $I_{TBS}$ | \multicolumn{10}{c}{$N_{PRB}$} |
|---|---|---|---|---|---|---|---|---|---|---|
|  | 71 | 72 | 73 | 74 | 75 | 76 | 77 | 78 | 79 | 80 |
| 29 | 66592 | 68808 | 68808 | 68808 | 71112 | 71112 | 73712 | 73712 | 73712 | 75376 |

When $I_{TBS}$ is equal to 29, and $81 \leq N_{PRB} \leq 90$, values of layer 1 TBS are as follows:

| $I_{TBS}$ | \multicolumn{10}{c}{$N_{PRB}$} |
|---|---|---|---|---|---|---|---|---|---|---|
|  | 81 | 82 | 83 | 84 | 85 | 86 | 87 | 88 | 89 | 90 |
| 29 | 76208 | 76208 | 78704 | 78704 | 81176 | 81176 | 81176 | 84760 | 84760 | 84760 |

When $I_{TBS}$ is equal to 29, and $91 \leq N_{PRB} \leq 100$, values of layer 1 TBS are as follows:

| $I_{TBS}$ | \multicolumn{10}{c}{$N_{PRB}$} |
|---|---|---|---|---|---|---|---|---|---|---|
|  | 91 | 92 | 93 | 94 | 95 | 96 | 97 | 98 | 99 | 100 |
| 29 | 84760 | 87936 | 87936 | 87936 | 90816 | 90816 | 90816 | 93800 | 93800 | 93800 |

When $I_{TBS}$ is equal to 29, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 29 | 93800 | 97896 | 97896 | 97896 | 97896 | 101840 | 101840 | 101840 | 101840 | 105528 |

When $I_{TBS}$ is equal to 30, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 30 | 1000 | 1992 | 2984 | 4008 | 4968 | 5992 | 6968 | 7992 | 9144 | 9912 |

When $I_{TBS}$ is equal to 30, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 30 | 11064 | 12216 | 12960 | 14112 | 15264 | 15840 | 16992 | 18336 | 19080 | 19848 |

When $I_{TBS}$ is equal to 30, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 30 | 21384 | 22152 | 22920 | 24496 | 25456 | 26416 | 27376 | 28336 | 29296 | 30576 |

When $I_{TBS}$ is equal to 30, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 30 | 31704 | 31704 | 32856 | 34008 | 35160 | 36696 | 36696 | 37888 | 39232 | 40576 |

When $I_{TBS}$ is equal to 30, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 30 | 40576 | 42368 | 43816 | 43816 | 45352 | 46888 | 46888 | 48936 | 48936 | 51024 |

When $I_{TBS}$ is equal to 30, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 30 | 51024 | 52752 | 52752 | 55056 | 55056 | 57336 | 57336 | 59256 | 59256 | 59256 |

When $I_{TBS}$ is equal to 30, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 30 | 61664 | 61664 | 63776 | 63776 | 66592 | 66592 | 66592 | 68808 | 68808 | 71112 |

When $I_{TBS}$ is equal to 30, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 30 | 71112 | 73712 | 73712 | 73712 | 75376 | 76208 | 78704 | 78704 | 78704 | 81176 |

When $I_{TBS}$ is equal to 30, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 30 | 81176 | 81176 | 84760 | 84760 | 84760 | 87936 | 87936 | 87936 | 90816 | 90816 |

When $I_{TBS}$ is equal to 30, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 30 | 90816 | 93800 | 93800 | 93800 | 93800 | 97896 | 97896 | 97896 | 97896 | 101840 |

When $I_{TBS}$ is equal to 30, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 30 | 101840 | 101840 | 105528 | 105528 | 105528 | 105528 | 105528 | 110136 | 110136 | 110136 |

Way a4, during hotspot cell coverage, the corresponding ITBS of the existing MCS table are appropriately adjusted, and the corresponding modulation scheme when the value of $I_{TBS}$ in the MCS table ranges from 27 to 32 is made to satisfy 256 QAM, wherein, the $I_{TBS}$ level number increases six levels than the existing standard. Specific method is as follows:

The existing standard TBS table is increased for six levels, with the corresponding level number in the existing MCS table increasing six levels accordingly, the value of new MCS ranging from 27 to 32, and the corresponding modulation scheme when value of $I_{TBS}$ ranges from 27 to 32 in MCS table is made to satisfy 256 QAM. The new adjusted MCS table is as shown in table below:

| New Adjusted MCS Table | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |

New Adjusted MCS Table

| MCS Index $I_{MCS}$ | Modulation Order $Q_m$ | TBS Index $I_{TBS}$ |
|---|---|---|
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |
| 32 | 8 | 26 |
| 33 | 8 | 27 |
| 34 | 8 | 28 |

New Adjusted MCS Table

| MCS Index $I_{MCS}$ | Modulation Order $Q_m$ | TBS Index $I_{TBS}$ |
|---|---|---|
| 35 | 8 | 29 |
| 36 | 8 | 30 |
| 37 | 8 | 31 |
| 38 | 8 | 32 |
| 39 | 8 | reserved |

By taking $I_{TBS}$ as index row and taking $N_{PRB}$ as index column, layer 1 TBS when the modulation scheme is 256 QAM is acquired by looking up the above MCS table.

The corresponding value of newly increased TBS when the value of $I_{TBS}$ ranges from 27 to 32 is acquired by adopting manners including any one or several of the following manners:

When $I_{TBS}$ is equal to 27, and $1 \leq N_{PRB} \leq 10$, values of layer 1 TBS are as follows:

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 27 | 776 | 1544 | 2344 | 3112 | 4008 | 4776 | 5544 | 6200 | 7224 | 7992 |

When $I_{TBS}$ is equal to 27, and $11 \leq N_{PRB} \leq 20$, values of layer 1 TBS are as follows:

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 27 | 8760 | 9528 | 10296 | 11064 | 11832 | 12576 | 13536 | 14112 | 15264 | 15840 |

When $I_{TBS}$ is equal to 27, and $21 \leq N_{PRB} \leq 30$, values of layer 1 TBS are as follows:

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 27 | 16416 | 17568 | 18336 | 19080 | 19848 | 20616 | 21384 | 22152 | 22920 | 23688 |

When $I_{TBS}$ is equal to 27, and $31 \leq N_{PRB} \leq 40$, values of layer 1 TBS are as follows:

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 27 | 24496 | 25456 | 26416 | 27376 | 27376 | 28336 | 29296 | 30576 | 30576 | 31704 |

When $I_{TBS}$ is equal to 27, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 27 | 32856 | 32856 | 34008 | 35160 | 35160 | 36696 | 37888 | 37888 | 39232 | 39232 |

When $I_{TBS}$ is equal to 27, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 27 | 40576 | 40576 | 42368 | 42368 | 43816 | 43816 | 45352 | 45352 | 46888 | 46888 |

When $I_{TBS}$ is equal to 27, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 27 | 48936 | 48936 | 51024 | 51024 | 51024 | 52752 | 52752 | 55056 | 55056 | 55056 |

When $I_{TBS}$ is equal to 27, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 27 | 57336 | 57336 | 57336 | 59256 | 59256 | 59256 | 61664 | 61664 | 63776 | 63776 |

When $I_{TBS}$ is equal to 27, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 27 | 63776 | 63776 | 66592 | 66592 | 66592 | 68808 | 68808 | 68808 | 71112 | 71112 |

When $I_{TBS}$ is equal to 27, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 27 | 71112 | 73712 | 73712 | 75376 | 75376 | 76208 | 76208 | 78704 | 78704 | 78704 |

When $I_{TBS}$ is equal to 27, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 27 | 81176 | 81176 | 81176 | 81176 | 84760 | 84760 | 84760 | 84760 | 87936 | 87936 |

When $I_{TBS}$ is equal to 28, and $1 \leq N_{PRB} \leq 10$, values of layer 1 TBS are as follows:

| | | | | | $N_{PRB}$ | | | | | |
|---|---|---|---|---|---|---|---|---|---|---|
| $I_{TBS}$ | 1 | 2 | 3 | 4 | 5 | 6 | 7 | 8 | 9 | 10 |
| 28 | 808 | 1672 | 2472 | 3368 | 4136 | 4968 | 5736 | 6712 | 7480 | 8248 |

When $I_{TBS}$ is equal to 28, and $11 \leq N_{PRB} \leq 20$, values of layer 1 TBS are as follows:

| | | | | | $N_{PRB}$ | | | | | |
|---|---|---|---|---|---|---|---|---|---|---|
| $I_{TBS}$ | 11 | 12 | 13 | 14 | 15 | 16 | 17 | 18 | 19 | 20 |
| 28 | 9144 | 9912 | 10680 | 11832 | 12576 | 13536 | 14112 | 15264 | 15840 | 16992 |

When $I_{TBS}$ is equal to 28, and $21 \leq N_{PRB} \leq 30$, values of layer 1 TBS are as follows:

| | | | | | $N_{PRB}$ | | | | | |
|---|---|---|---|---|---|---|---|---|---|---|
| $I_{TBS}$ | 21 | 22 | 23 | 24 | 25 | 26 | 27 | 28 | 29 | 30 |
| 28 | 17568 | 18336 | 19080 | 19848 | 20616 | 21384 | 22920 | 23688 | 24496 | 25456 |

When $I_{TBS}$ is equal to 28, and $31 \leq N_{PRB} \leq 40$, values of layer 1 TBS are as follows:

| | | | | | $N_{PRB}$ | | | | | |
|---|---|---|---|---|---|---|---|---|---|---|
| $I_{TBS}$ | 31 | 32 | 33 | 34 | 35 | 36 | 37 | 38 | 39 | 40 |
| 28 | 25456 | 26416 | 27376 | 28336 | 29296 | 30576 | 30576 | 31704 | 32856 | 34008 |

When $I_{TBS}$ is equal to 28, and $41 \leq N_{PRB} \leq 50$, values of layer 1 TBS are as follows:

| | | | | | $N_{PRB}$ | | | | | |
|---|---|---|---|---|---|---|---|---|---|---|
| $I_{TBS}$ | 41 | 42 | 43 | 44 | 45 | 46 | 47 | 48 | 49 | 50 |
| 28 | 34008 | 35160 | 36696 | 36696 | 37888 | 37888 | 39232 | 40576 | 40576 | 42368 |

When $I_{TBS}$ is equal to 28, and $51 \leq N_{PRB} \leq 60$, values of layer 1 TBS are as follows:

| | | | | | $N_{PRB}$ | | | | | |
|---|---|---|---|---|---|---|---|---|---|---|
| $I_{TBS}$ | 51 | 52 | 53 | 54 | 55 | 56 | 57 | 58 | 59 | 60 |
| 28 | 42368 | 43816 | 43816 | 45352 | 45352 | 46888 | 46888 | 48936 | 48936 | 51024 |

When $I_{TBS}$ is equal to 28, and $61 \leq N_{PRB} \leq 70$, values of layer 1 TBS are as follows:

| | | | | | $N_{PRB}$ | | | | | |
|---|---|---|---|---|---|---|---|---|---|---|
| $I_{TBS}$ | 61 | 62 | 63 | 64 | 65 | 66 | 67 | 68 | 69 | 70 |
| 28 | 51024 | 51024 | 52752 | 52752 | 55056 | 55056 | 55056 | 57336 | 57336 | 59256 |

When $I_{TBS}$ is equal to 28, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 28 | 59256 | 59256 | 61664 | 61664 | 63776 | 63776 | 63776 | 66592 | 66592 | 66592 |

When $I_{TBS}$ is equal to 28, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 28 | 68808 | 68808 | 68808 | 71112 | 71112 | 71112 | 73712 | 73712 | 73712 | 75376 |

When $I_{TBS}$ is equal to 28, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 28 | 76208 | 76208 | 78704 | 78704 | 78704 | 81176 | 81176 | 81176 | 81176 | 84760 |

When $I_{TBS}$ is equal to 28, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 28 | 84760 | 84760 | 84760 | 87936 | 87936 | 87936 | 90816 | 90816 | 90816 | 90816 |

When $I_{TBS}$ is equal to 29, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 29 | 872 | 1736 | 2600 | 3496 | 4392 | 5352 | 6200 | 6968 | 7992 | 8760 |

When $I_{TBS}$ is equal to 29, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 29 | 9528 | 10680 | 11448 | 12216 | 12960 | 14112 | 14688 | 15840 | 16416 | 17568 |

When $I_{TBS}$ is equal to 29, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 29 | 18336 | 19080 | 19848 | 21384 | 22152 | 22920 | 23688 | 24496 | 25456 | 26416 |

When $I_{TBS}$ is equal to 29, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 29 | 27376 | 28336 | 29296 | 29296 | 30576 | 31704 | 32856 | 32856 | 34008 | 35160 |

When $I_{TBS}$ is equal to 29, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 29 | 36696 | 36696 | 37888 | 39232 | 39232 | 40576 | 40576 | 42368 | 43816 | 43816 |

When $I_{TBS}$ is equal to 29, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 29 | 45352 | 45352 | 46888 | 46888 | 48936 | 48936 | 51024 | 51024 | 52752 | 52752 |

When $I_{TBS}$ is equal to 29, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 29 | 52752 | 55056 | 55056 | 57336 | 57336 | 57336 | 59256 | 59256 | 61664 | 61664 |

When $I_{TBS}$ is equal to 29, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 29 | 61664 | 63776 | 63776 | 63776 | 66592 | 66592 | 68808 | 68808 | 68808 | 71112 |

When $I_{TBS}$ is equal to 29, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 29 | 71112 | 71112 | 73712 | 73712 | 75376 | 75376 | 76208 | 76208 | 78704 | 78704 |

When $I_{TBS}$ is equal to 29, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 29 | 81176 | 81176 | 81176 | 81176 | 84760 | 84760 | 84760 | 84760 | 87936 | 87936 |

When $I_{TBS}$ is equal to 29, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 29 | 87936 | 90816 | 90816 | 90816 | 93800 | 93800 | 93800 | 93800 | 97896 | 97896 |

When $I_{TBS}$ is equal to 30, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 30 | 904 | 1800 | 2728 | 3624 | 4584 | 5544 | 6456 | 7224 | 8248 | 9144 |

When $I_{TBS}$ is equal to 30, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 30 | 10296 | 11064 | 11832 | 12960 | 13536 | 14688 | 15840 | 16416 | 17568 | 18336 |

When $I_{TBS}$ is equal to 30, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 30 | 19080 | 20616 | 21384 | 22152 | 22920 | 23688 | 24496 | 25456 | 26416 | 27376 |

When $I_{TBS}$ is equal to 30, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 30 | 28336 | 29296 | 30576 | 31704 | 31704 | 32856 | 34008 | 35160 | 36696 | 36696 |

When $I_{TBS}$ is equal to 30, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 30 | 37888 | 39232 | 39232 | 40576 | 42368 | 42368 | 43816 | 43816 | 45352 | 45352 |

When $I_{TBS}$ is equal to 30, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 30 | 46888 | 48936 | 48936 | 48936 | 51024 | 51024 | 52752 | 52752 | 55056 | 55056 |

When $I_{TBS}$ is equal to 30, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 30 | 57336 | 57336 | 57336 | 59256 | 59256 | 61664 | 61664 | 61664 | 63776 | 63776 |

When $I_{TBS}$ is equal to 30, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 30 | 66592 | 66592 | 66592 | 68808 | 68808 | 71112 | 71112 | 71112 | 73712 | 73712 |

When $I_{TBS}$ is equal to 30, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 30 | 75376 | 75376 | 76208 | 78704 | 78704 | 78704 | 81176 | 81176 | 81176 | 84760 |

When $I_{TBS}$ is equal to 30, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 30 | 84760 | 84760 | 84760 | 87936 | 87936 | 87936 | 90816 | 90816 | 90816 | 90816 |

When $I_{TBS}$ is equal to 30, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 30 | 93800 | 93800 | 93800 | 97896 | 97896 | 97896 | 97896 | 97896 | 101840 | 101840 |

When $I_{TBS}$ is equal to 31, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 31 | 936 | 1928 | 2856 | 3880 | 4776 | 5736 | 6712 | 7736 | 8760 | 9528 |

When $I_{TBS}$ is equal to 31, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 31 | 10680 | 11448 | 12576 | 13536 | 14688 | 15264 | 16416 | 17568 | 18336 | 19080 |

When $I_{TBS}$ is equal to 31, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 31 | 19848 | 21384 | 22152 | 22920 | 24496 | 25456 | 26416 | 27376 | 28336 | 29296 |

When $I_{TBS}$ is equal to 31, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 31 | 29296 | 30576 | 31704 | 32856 | 34008 | 35160 | 35160 | 36696 | 37888 | 39232 |

When $I_{TBS}$ is equal to 31, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 31 | 39232 | 40576 | 42368 | 42368 | 43816 | 43816 | 45352 | 46888 | 46888 | 48936 |

When $I_{TBS}$ is equal to 31, and $51 \leq N_{PRB} \leq 60$, values of layer 1 TBS are as follows:

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 31 | 48936 | 51024 | 51024 | 52752 | 52752 | 55056 | 55056 | 55056 | 57336 | 57336 |

When $I_{TBS}$ is equal to 31, and $61 \leq N_{PRB} \leq 70$, values of layer 1 TBS are as follows:

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 31 | 59256 | 59256 | 61664 | 61664 | 61664 | 63776 | 63776 | 66592 | 66592 | 66592 |

When $I_{TBS}$ is equal to 31, and $71 \leq N_{PRB} \leq 80$, values of layer 1 TBS are as follows:

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 31 | 68808 | 68808 | 71112 | 71112 | 71112 | 73712 | 73712 | 75376 | 76208 | 76208 |

When $I_{TBS}$ is equal to 31, and $81 \leq N_{PRB} \leq 90$, values of layer 1 TBS are as follows:

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 31 | 78704 | 78704 | 81176 | 81176 | 81176 | 84760 | 84760 | 84760 | 84760 | 87936 |

When $I_{TBS}$ is equal to 31, and $91 \leq N_{PRB} \leq 100$, values of layer 1 TBS are as follows:

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 31 | 87936 | 87936 | 90816 | 90816 | 90816 | 93800 | 93800 | 93800 | 93800 | 97896 |

When $I_{TBS}$ is equal to 31, and $101 \leq N_{PRB} \leq 110$, values of layer 1 TBS are as follows:

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 31 | 97896 | 97896 | 97896 | 101840 | 101840 | 101840 | 101840 | 105528 | 105528 | 105528 |

When $I_{TBS}$ is equal to 32, and $1 \leq N_{PRB} \leq 10$, values of layer 1 TBS are as follows:

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 32 | 1000 | 1992 | 2984 | 4008 | 4968 | 5992 | 6968 | 7992 | 9144 | 9912 |

When $I_{TBS}$ is equal to 32, and $11 \leq N_{PRB} \leq 20$, values of layer 1 TBS are as follows:

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 32 | 11064 | 12216 | 12960 | 14112 | 15264 | 15840 | 16992 | 18336 | 19080 | 19848 |

When $I_{TBS}$ is equal to 32, and $21 \leq N_{PRB} \leq 30$, values of layer 1 TBS are as follows:

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 32 | 21384 | 22152 | 22920 | 24496 | 25456 | 26416 | 27376 | 28336 | 29296 | 30576 |

When $I_{TBS}$ is equal to 32, and $31 \leq N_{PRB} \leq 40$, values of layer 1 TBS are as follows:

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 32 | 31704 | 31704 | 32856 | 34008 | 35160 | 36696 | 36696 | 37888 | 39232 | 40576 |

When $I_{TBS}$ is equal to 32, and $41 \leq N_{PRB} \leq 50$, values of layer 1 TBS are as follows:

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 32 | 40576 | 42368 | 43816 | 43816 | 45352 | 46888 | 46888 | 48936 | 48936 | 51024 |

When $I_{TBS}$ is equal to 32, and $51 \leq N_{PRB} \leq 60$, values of layer 1 TBS are as follows:

| | $N_{PRB}$ | | | | | | | | |
|---|---|---|---|---|---|---|---|---|---|
| $I_{TBS}$ | 51 | 52 | 53 | 54 | 55 | 56 | 57 | 58 | 59 | 60 |
| 32 | 51024 | 52752 | 52752 | 55056 | 55056 | 57336 | 57336 | 59256 | 59256 | 59256 |

When $I_{TBS}$ is equal to 32, and $61 \leq N_{PRB} \leq 70$, values of layer 1 TBS are as follows:

| | $N_{PRB}$ | | | | | | | | |
|---|---|---|---|---|---|---|---|---|---|
| $I_{TBS}$ | 61 | 62 | 63 | 64 | 65 | 66 | 67 | 68 | 69 | 70 |
| 32 | 61664 | 61664 | 63776 | 63776 | 66592 | 66592 | 66592 | 68808 | 68808 | 71112 |

When $I_{TBS}$ is equal to 32, and $71 \leq N_{PRB} \leq 80$, values of layer 1 TBS are as follows:

| | $N_{PRB}$ | | | | | | | | |
|---|---|---|---|---|---|---|---|---|---|
| $I_{TBS}$ | 71 | 72 | 73 | 74 | 75 | 76 | 77 | 78 | 79 | 80 |
| 32 | 71112 | 73712 | 73712 | 73712 | 75376 | 76208 | 78704 | 78704 | 78704 | 81176 |

When $I_{TBS}$ is equal to 32, and $81 \leq N_{PRB} \leq 90$, values of layer 1 TBS are as follows:

| | $N_{PRB}$ | | | | | | | | |
|---|---|---|---|---|---|---|---|---|---|
| $I_{TBS}$ | 81 | 82 | 83 | 84 | 85 | 86 | 87 | 88 | 89 | 90 |
| 32 | 81176 | 81176 | 84760 | 84760 | 84760 | 87936 | 87936 | 87936 | 90816 | 90816 |

When $I_{TBS}$ is equal to 32, and $91 \leq N_{PRB} \leq 100$, values of layer 1 TBS are as follows:

| | $N_{PRB}$ | | | | | | | | |
|---|---|---|---|---|---|---|---|---|---|
| $I_{TBS}$ | 91 | 92 | 93 | 94 | 95 | 96 | 97 | 98 | 99 | 100 |
| 32 | 90816 | 93800 | 93800 | 93800 | 93800 | 97896 | 97896 | 97896 | 97896 | 101840 |

When $I_{TBS}$ is equal to 32, and $101 \leq N_{PRB} \leq 110$, values of layer 1 TBS are as follows:

| | $N_{PRB}$ | | | | | | | | |
|---|---|---|---|---|---|---|---|---|---|
| $I_{TBS}$ | 101 | 102 | 103 | 104 | 105 | 106 | 107 | 108 | 109 | 110 |
| 32 | 101840 | 101840 | 105528 | 105528 | 105528 | 105528 | 105528 | 110136 | 110136 | 110136 |

Step b, on the basis of $N_{PRB}$, $I_{TBS}$ and the number of transport block mapping layers, the base station determines the TBS currently transmitting data, and transmits data on the basis of the TBS. Specific method is as follows:

b1, the value of layer 2 TBS, i.e., conversion relation of layers 1-2 TBS is determined;

When $1 \leq N_{PRB} \leq 55$, the corresponding TBS in layer 1 table via the index ($I_{TBS}$, $2 \cdot N_{PRB}$) is found from layer 1 TBS table, which is the value of layer 2 TBS.

When $56 \leq N_{PRB} \leq 110$, there is the following mapping relation from layer 1 of newly increased TBS, wherein TBS_L1 represents layer 1 TBS, and TBS_L2 represents layer 2 TBS:

| | TBS_L1 | | | | | | | | | |
|---|---|---|---|---|---|---|---|---|---|---|
| | 76208 | 78704 | 81176 | 84760 | 87936 | 90816 | 93800 | 97896 | 101840 | 105528 | 110136 |
| TBS_L2 | 152976 | 157432 | 161760 | 169544 | 175600 | 181656 | 187712 | 195816 | 203704 | 211936 | 220296 | b2, the value of layer 3 TBS, i.e., conversion relation of layers 1-3 TBS is determined;

When $1 \leq N_{PRB} \leq 36$, the corresponding TBS in layer 1 table is found via the index ($I_{TBS}$, $3 \cdot N_{PRB}$) from layer 1 TBS table, which is the value of layer 3 TBS.

When $37 \leq N_{PRB} \leq 110$, there is the following mapping relation from layer 1 of newly increased TBS, wherein TBS_L1 represents layer 1 TBS, and TBS_L2 represents layer 3 TBS:

| | TBS_L1 | | | | | | | | | |
|---|---|---|---|---|---|---|---|---|---|---|
| | 76208 | 78704 | 81176 | 84760 | 87936 | 90816 | 93800 | 97896 | 101840 | 105528 | 110136 |
| TBS_L3 | 230104 | 236160 | 245648 | 254328 | 266440 | 275376 | 284608 | 293736 | 305592 | 317064 | 330456 | b3, the value of layer 3 TBS, i.e., conversion relation of layers 1-4 TBS is determined;

When $1 \leq N_{PRB} \leq 27$, the corresponding TBS in layer 1 table via the index ($I_{TBS}$, $4 \cdot N_{PRB}$) is found from layer 1 TBS table, which is the value of layer 4 TBS.

When $28 \leq N_{PRB} \leq 110$, there is the following mapping relation from layer 1 of newly increased TBS, wherein TBS_L1 represents layer 1 TBS, and TBS_L2 represents layer 4 TBS:

| | TBS_L1 | | | | | | | | | |
|---|---|---|---|---|---|---|---|---|---|---|
| | 76208 | 78704 | 81176 | 84760 | 87936 | 90816 | 93800 | 97896 | 101840 | 105528 | 110136 |
| TBS_L4 | 305144 | 314888 | 326104 | 339112 | 353976 | 363336 | 375320 | 391656 | 408928 | 422256 | 440616 | b4, on the basis of $N_{PRB}$, $I_{TBS}$ and the number of transport block mapping layers, the base station determines the TBS currently transmitting data, and transmits data on the basis of the TBS;

Said "on the basis of $N_{PRB}$, $I_{TBS}$ and the number of transport block mapping layers, the base station determines the TBS currently transmitting data" includes: determine the TBS currently transmitting data on the basis of the conversion relation, specifically, When $1 \leq N_{PRB} \leq 55$, the corresponding TBS in layer 1 table is found via the index ($I_{TBS}$, $2 \cdot N_{PRB}$) from layer 1 TBS table, namely the value of layer 2 TBS; when $56 \leq N_{PRB} \leq 110$, layer 1 TBS from layer 1 TBS table on the basis of $N_{PRB}$, $I_{TBS}$ is determined, namely, the value of layer 2 TBS;

When $1 \leq N_{PRB} \leq 36$, the corresponding TBS in layer 1 table is found via the index ($I_{TBS}$, $3 \cdot N_{PRB}$) from layer 1 TBS table, namely the value of layer 3 TBS; when $36 \leq N_{PRB} \leq 110$, layer 1 TBS from layer 1 TBS table on the basis of $N_{PRB}$, $I_{TBS}$ is determined, namely the value of layer 3 TBS;

When $1 \leq N_{PRB} \leq 27$, the corresponding TBS in layer 1 table is found via the index ($I_{TBS}$, $4 \cdot N_{PRB}$) from layer 1 TBS table, which is the value of layer 4 TBS; when $28 \leq N_{PRB} \leq 110$, layer 1 TBS from layer 1 TBS table on the basis of $N_{PRB}$, $I_{TBS}$ is determined, which is the value of layer 4 TBS.

Embodiment of the disclosure also provides a device for transmitting data, which include: an adjustment unit, an acquisition unit, and a transmission unit, wherein, the adjustment unit is configured to adjust a MCS table allowing the same to satisfy a 256 QAM modulation scheme;

the acquisition unit is configured to acquire layer 1 TBS when the modulation scheme is 256 QAM;

and the transmission unit is configured to, on the basis of $N_{PRB}$, $I_{TBS}$ and the number of TB mapping layers, determine the TBS currently transmit data, and transmit data on the basis of the TBS.

Embodiments of the disclosure also provide a base station, which includes a device for transmitting data. The device for transmitting data includes an adjustment unit, an acquisition unit, and a transmission unit, wherein, the adjustment unit is configured to adjust a MCS table allowing the same to satisfy a 256 QAM modulation scheme;

the acquisition unit is configured to acquire layer 1 TBS when the modulation scheme is 256 QAM;

and the transmission unit is configured to, on the basis of $N_{PRB}$, $I_{TBS}$ and the number of transport block mapping layers, determine the TBS currently transmit data, and transmit data on the basis of the TBS.

Specific implementation of each module has been well described in the method as such no further description is provided herein.

How to utilize the method of the disclosure to determine the block size of TB by several examples will specifically illustrated below.

Example 1

Figure 2:
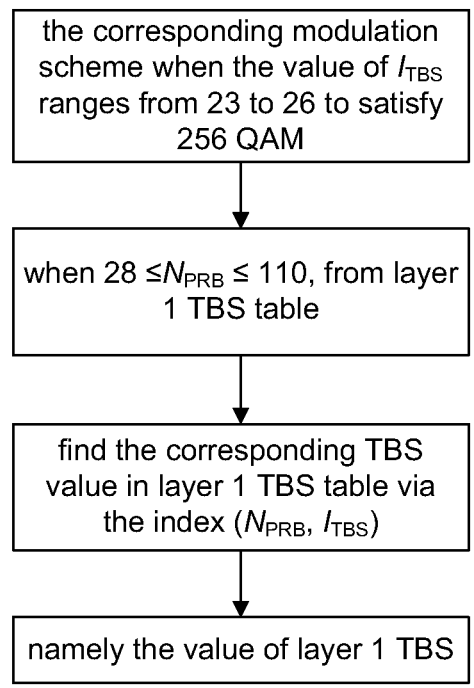
FIG. 2 is a flow diagram of determining the transmission value of layer 1 TBS of an embodiment of the disclosure when $1 \leq N_{PRB} \leq 110$, $I_{TBS}$ level number is the same with the existing standard TBS table, and in the case that the corresponding modulation scheme when $I_{TBS}$ ranges from 23 to 26 satisfies 256 QAM.

FIG. 2 is a flow diagram of determining the transmission value of layer 1 TBS of an embodiment of the disclosure when $1 \leq N_{PRB} \leq 110$, $I_{TBS}$ level number is the same with the existing standard TBS table, and in the case that the corresponding modulation scheme when $I_{TBS}$ ranges from 23 to 26 satisfies 256 QAM.

For example, for the determination of layer 1 TBS when the $I_{TBS}=23$ and $N_{PRB}=5$, by looking up layer 1 $I_{TBS}=23$ and $N_{PRB}=5$, we can know that layer 1 TBS equals 4008 bits by table look-up.

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 23 | 808 | 1608 | 2408 | 3240 | 4008 | 4968 | 5736 | 6456 | 7224 | 8248 |

Example 2

Figure 3:
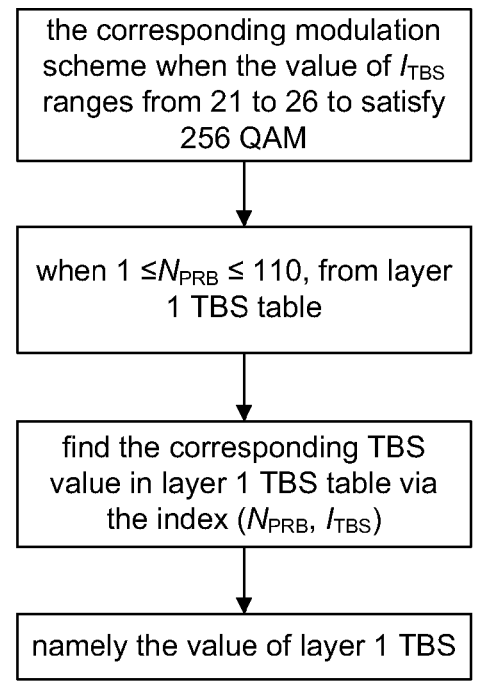
FIG. 3 is a flow diagram of determining the transmission value of layer 1 TBS of an embodiment of the disclosure when $1 \leq N_{PRB} \leq 110$, $I_{TBS}$ level number is the same with the existing standard TBS table, and in the case that the corresponding modulation scheme when $I_{TBS}$ ranges from 21 to 26 satisfies 256 QAM.

FIG. 3 is a flow diagram of determining the transmission value of layer 1 TBS of an embodiment of the disclosure when $1 \leq N_{PRB} \leq 110$, the $I_{TBS}$ level number is the same with the existing standard TBS table, and in the case that the corresponding modulation scheme when $I_{TBS}$ ranges from 21 to 26 satisfies 256 QAM.

For example, for the determination of layer 1 TBS when the $I_{TBS}=26$ and $N_{PRB}=101$, by looking up layer 1 $I_{TBS}=26$ and $N_{PRB}=101$, we can know that layer 1 TBS equals 101840 bits by table look-up.

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 26 | 101840 | 101840 | 105528 | 105528 | 105528 | 105528 | 105528 | 110136 | 110136 | 110136 |

Example 3

Figure 4:
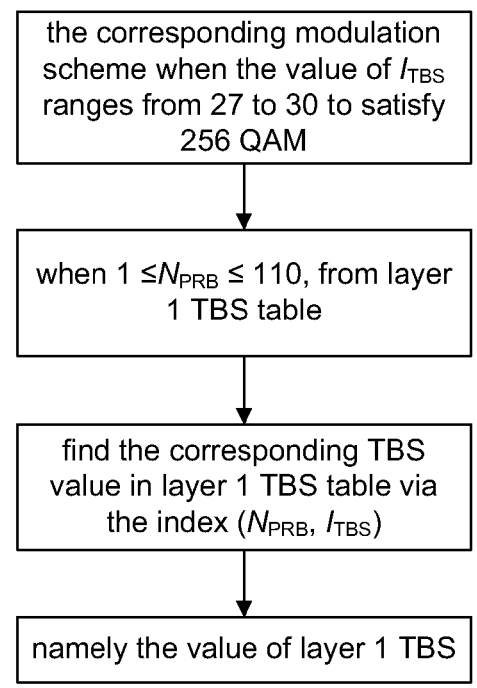
FIG. 4 is a flow diagram of determining the transmission value of layer 1 TBS of an embodiment of the disclosure when $1 \leq N_{PRB} \leq 110$, $I_{TBS}$ level number is four levels higher than the existing standard TBS table, and in the case that the corresponding modulation scheme when $I_{TBS}$ ranges from 27 to 30 satisfies 256 QAM.

FIG. 4 is a flow diagram of determining the transmission value of layer 1 TBS of an embodiment of the disclosure when $1 \leq N_{PRB} \leq 110$, $I_{TBS}$ level number is four levels higher than the existing standard TBS table, and in the case that the corresponding modulation scheme when $I_{TBS}$ ranges from 27 to 30 satisfies 256 QAM.

For example, for the determination of layer 1 TBS when the $I_{TBS}=28$ and $N_{PRB}=41$, by looking up layer 1 $I_{TBS}=28$ and $N_{PRB}=41$, we can know that layer 1 TBS equals 36696 bits by table look-up.

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 28 | 36696 | 36696 | 37888 | 39232 | 39232 | 40576 | 40576 | 42368 | 43816 | 43816 |

Example 4

Figure 5:
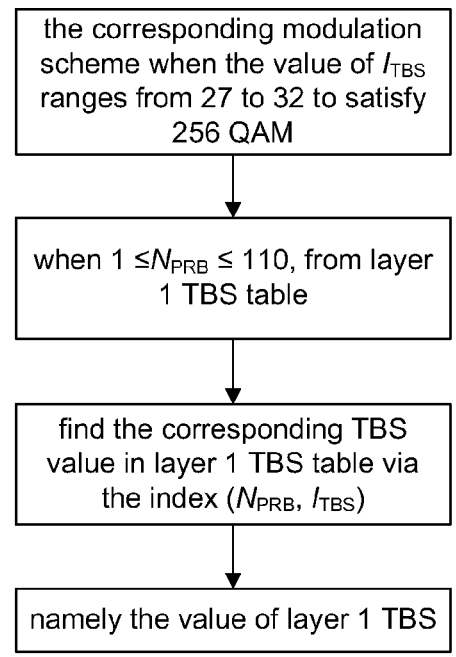
FIG. 5 is a flow diagram of determining the transmission value of layer 1 TBS of an embodiment of the disclosure when $1 \leq N_{PRB} \leq 110$, $I_{TBS}$ level number is six levels higher than the existing standard TBS table, and in the case that the corresponding modulation scheme when $I_{TBS}$ ranges from 27 to 32 satisfies 256 QAM.

FIG. 5 is a flow diagram of determining the transmission value of layer 1 TBS of an embodiment of the disclosure when $1 \leq N_{PRB} \leq 110$, $I_{TBS}$ level number is six levels higher than the existing standard TBS table, and in the case that the corresponding modulation scheme when $I_{TBS}$ ranges from 27 to 32 satisfies 256 QAM.

For example, for the determination of layer 1 TBS when the $I_{TBS}=31$ and $N_{PRB}=110$, by looking up layer 1 $I_{TBS}=31$ and $N_{PRB}=110$, we can know that layer 1 TBS equals 110136 bits by table look-up.

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 31 | 101840 | 101840 | 105528 | 105528 | 105528 | 105528 | 105528 | 110136 | 110136 | 110136 |

Example 5

Figure 6:
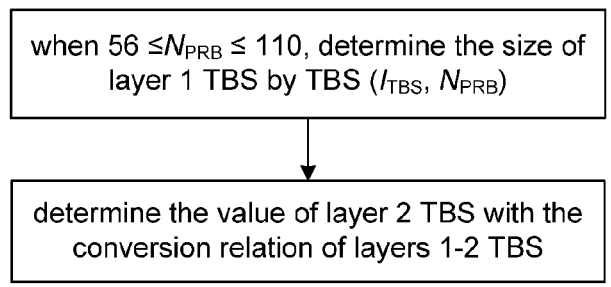
FIG. 6 is a flow diagram for utilizing the conversion relation table of layers 1-2 to determine the transmission value of layer 2 TBS of an embodiment of the disclosure in the case that $56 \leq N_{PRB} \leq 110$, from layer 1 of newly increased TBS.

FIG. 6 is a flow diagram for utilizing the conversion relation table of layers 1-2 to determine the transmission value of layer 2 TBS of an embodiment of the disclosure in the case that $56 \leq N_{PRB} \leq 110$, from layer 1 of newly increased TBS.

For example, for the determination of layer 2 when $I_{TBS}=26$ and $N_{PRB}=108$, first, find the TBS value when layer 1 $I_{TBS}=26$ and $N_{PRB}=108$, we can know layer 1 TBS equals 87936 bits by table look-up.

According to the conversion relation table of layers 1-2 TBS, select the size of layer 2 TBS is 175600 bits.

|        | TBS_L1 |        |        |        |        |        |        |        |        |        |        |
|--------|--------|--------|--------|--------|--------|--------|--------|--------|--------|--------|--------|
|        |        | 76208  | 78704  | 81176  | 84760  | 87936  | 90816  | 93800  | 97896  | 101840 | 105528 | 110136 |
| TBS_L2 |        | 152976 | 157432 | 161760 | 169544 | 175600 | 181656 | 187712 | 195816 | 203704 | 211936 | 220296 |

Example 6

Figure 7:
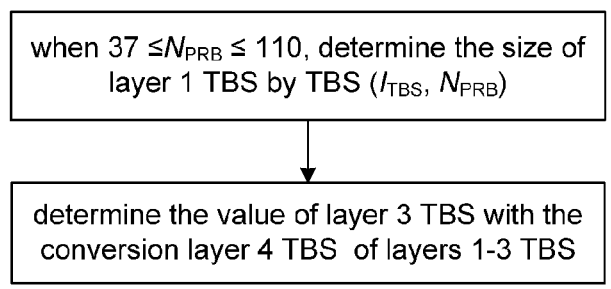
FIG. 7 is a flow diagram for utilizing the conversion relation table of layers 1-3 to determine the transmission value of layer 3 TBS of an embodiment of the disclosure in the case that $37 \leq N_{PRB} \leq 110$, from layer 1 of newly increased TBS.

FIG. 7 is a flow diagram for utilizing the conversion relation table of layers 1-3 to determine the transmission value of layer 3 TBS of an embodiment of the disclosure in the case that $37 \leq N_{PRB} \leq 110$, from layer 1 of newly increased TBS.

For example, for the determination of layer 3 when $I_{TBS}=26$ and $N_{PRB}=106$, first, find the TBS value when layer 1 $I_{TBS}=26$ and $N_{PRB}=106$, we can know layer 1 TBS equals 105528 bits by table look-up.

According to the conversion relation table of layers 1-3 TBS, select the size of layer 3 TBS is 317064 bits.

|        | TBS_L1 |        |        |        |        |        |        |        |        |        |        |
|--------|--------|--------|--------|--------|--------|--------|--------|--------|--------|--------|--------|
|        | 76208  | 78704  | 81176  | 84760  | 87936  | 90816  | 93800  | 97896  | 101840 | 105528 | 110136 |
| TBS_L3 | 230104 | 236160 | 245648 | 254328 | 266440 | 275376 | 284608 | 293736 | 305592 | 317064 | 330456 |

Example 7

Figure 8:
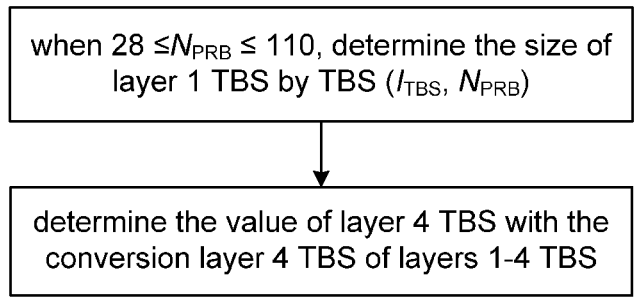
FIG. 8 is a flow diagram for utilizing the conversion relation table of layers 1-4 to determine the transmission value of layer 4 TBS of an embodiment of the disclosure in the case that $28 \leq N_{PRB} \leq 110$, from layer 1 of newly increased TBS.

FIG. 8 is a flow diagram for utilizing the conversion relation table of one to layer 4 to determine the transmission value of layer 4 TBS of an embodiment of the disclosure in the case that $28 \leq N_{PRB} \leq 110$, from layer 1 of newly increased TBS.

For example, for the determination of layer 3 when $I_{TBS}=32$ and $N_{PRB}=100$, first, find the TBS value when layer 1 $I_{TBS}=26$ and $N_{PRB}=106$, we can know layer 1 TBS equals 101840 bits by table look-up.

According to the conversion relation table of layers 1-4 TBS, select the size of layer 4 TBS is 408928 bits.

|        | TBS_L1 |        |        |        |        |        |        |        |        |        |        |
|--------|--------|--------|--------|--------|--------|--------|--------|--------|--------|--------|--------|
|        | 76208  | 78704  | 81176  | 84760  | 87936  | 90816  | 93800  | 97896  | 101840 | 105528 | 110136 |
| TBS_L4 | 305144 | 314888 | 326104 | 339112 | 353976 | 363336 | 375320 | 391656 | 408928 | 422256 | 440616 |

The above description illustrates a preferred embodiment of the disclosure, but as aforementioned, it should be understood that the disclosure is not limited to the form disclosed herein, and should not be considered to exclude other examples, but may be used in various other combinations, modifications, and environments, and is capable of changes within the scope of the inventive concept as expressed herein, commensurate with the above teachings, or the skill or knowledge of the relevant art. And those modifications and variations made by those skilled in the art do not depart from the spirit and scope of the disclosure, shall all fall within the scope of the appended claims of the disclosure.

The invention claimed is:

1. A method for transmitting data of hotspot cell coverage, comprising:
step a. adjusting, by a base station, a Modulation and Coding Scheme (MCS) table allowing the same to satisfy a 256 QAM modulation scheme, and acquiring a layer 1 Transport Block Size (TBS) when the modulation scheme is 256 QAM;
step b. on the basis of $N_{PRB}$, $I_{TBS}$ and the number of Transport Block (TB) mapping layers, determining, by the base station, the TBS currently transmitting data, and transmitting data on the basis of the TBS.

2. The method according to claim 1, wherein step of acquiring the layer 1 TBS when the modulation scheme is 256 QAM as described in the step a, comprising: on the basis of $N_{PRB}$ and $I_{TBS}$, taking $I_{TBS}$ as index row, taking $N_{PRB}$ as index column, looking up, by the base station, the MCS table to acquire the layer 1 TBS when the modulation scheme is 256 QAM.

3. The method according to claim 2, wherein acquiring the layer 1 TBS when the modulation scheme is 256 QAM by adopting any one or several of the following ways:
way a1, making the corresponding modulation scheme when the value of $I_{TBS}$ in the MCS table ranges from 23 to 26 to satisfy 256 QAM;
way a2, making the corresponding modulation scheme when the value of $I_{TBS}$ in the MCS table ranges from 21 to 26 to satisfy 256 QAM;
way a3, making the corresponding modulation scheme when the value of $I_{TBS}$ in the MCS table ranges from 27 to 30 to satisfy 256 QAM;
way a4, making the corresponding modulation scheme when the value of $I_{TBS}$ in the MCS table ranges from 27 to 32 to satisfy 256 QAM.

4. The method according to claim 1, wherein step of on the basis of $N_{PRB}$, $I_{TBS}$ and the number of transport block mapping layers, determining, by the base station, the TBS currently transmitting data as described in step b, comprising:

when $1 \leq N_{PRB} \leq 55$, finding the corresponding TBS in the layer 1 TBS table via the index ($I_{TBS}$, $2 \cdot N_{PRB}$) from the layer 1 TBS table, namely the value of layer 2 TBS;

when $56 \leq N_{PRB} \leq 110$, on the basis of $N_{PRB}$ and $I_{TBS}$, layer 1 TBS from the layer 1 TBS table, and finding the corresponding TBS in the conversion relation of layers 1-2 TBS via the layer 1 TBS, namely the value of layer 2 TBS.

5. The method according to claim 1, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 36$, finding the corresponding TBS in the layer 1 TBS table via the index ($I_{TBS}$, $3 \cdot N_{PRB}$) from the layer 1 TBS table, namely the value of layer 3 TBS;

when $37 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-3 TBS via the layer 1 TBS, namely the value of layer 3 TBS.

6. The method according to claim 1, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 27$, finding the corresponding TBS in the layer 1 TBS table via the index ($I_{TBS}$, $4 \cdot N_{PRB}$) from the layer 1 TBS table, namely the value of layer 4 TBS;

when $28 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-4 TBS via the layer 1 TBS, namely the value of layer 4 TBS.

7. A device for transmitting data of hotspot cell coverage, comprising: an adjustment unit, an acquisition unit, and a transmission unit, wherein, the adjustment unit is configured to adjust a Modulation and Coding Scheme (MCS) table allowing the same to satisfy a 256 QAM modulation scheme;

the acquisition unit is configured to acquire a layer 1 Transport Block Size (TBS) when the modulation scheme is 256 QAM;

and the transmission unit is configured to, on the basis of $N_{PRB}$, $I_{TBS}$ and the number of Transport Block (TB) mapping layers, determine the TBS currently transmit data, and transmit data on the basis of the TBS.

8. A base station, comprising a device for transmitting data, the device for transmitting data comprising: an adjustment unit, an acquisition unit, and a transmission unit, wherein, the adjustment unit is configured to adjust a Modulation and Coding Scheme (MCS) table allowing the same to satisfy a 256 QAM modulation scheme;

the acquisition unit is configured to acquire a layer 1 Transport Block Size (TBS) when the modulation scheme is 256 QAM;

and the transmission unit is configured to, on the basis of $N_{PRB}$, $I_{TBS}$ and the number of transport block mapping layers, determine the TBS currently transmit data, and transmit data on the basis of the TBS.

9. The method according to claim 2, wherein step of on the basis of $N_{PRB}$, $I_{TBS}$ and the number of transport block mapping layers, determining, by the base station, the TBS currently transmitting data as described in step b, comprising:

when $1 \leq N_{PRB} \leq 55$, finding the corresponding TBS in the layer 1 TBS table via the index ($I_{TBS}$, $2 \cdot N_{PRB}$) from the layer 1 TBS table, namely the value of layer 2 TBS;

when $56 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-2 TBS via the layer 1 TBS, namely the value of layer 2 TBS.

10. The method according to claim 3, wherein step of on the basis of $N_{PRB}$, $I_{TBS}$ and the number of transport block mapping layers, determining, by the base station, the TBS currently transmitting data as described in step b, comprising:

when $1 \leq N_{PRB} \leq 55$, finding the corresponding TBS in the layer 1 TBS table via the index ($I_{TBS}$, $2 \cdot N_{PRB}$) from the layer 1 TBS table, namely the value of layer 2 TBS;

when $56 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-2 TBS via the layer 1 TBS, namely the value of layer 2 TBS.

11. The method according to claim 2, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 36$, finding the corresponding TBS in the layer 1 TBS table via the index ($I_{TBS}$, $3 \cdot N_{PRB}$) from the layer 1 TBS table, namely the value of layer 3 TBS;

when $37 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-3 TBS via the layer 1 TBS, namely the value of layer 3 TBS.

12. The method according to claim 3, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 36$, finding the corresponding TBS in the layer 1 TBS table via the index ($I_{TBS}$, $3 \cdot N_{PRB}$) from the layer 1 TBS table, namely the value of layer 3 TBS;

when $37 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-3 TBS via the layer 1 TBS, namely the value of layer 3 TBS.

13. The method according to claim 2, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 27$, finding the corresponding TBS in the layer 1 TBS table via the index ($I_{TBS}$, $4 \cdot N_{PRB}$) from the layer 1 TBS table, namely the value of layer 4 TBS;

when $28 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-4 TBS via the layer 1 TBS, namely the value of layer 4 TBS.

14. The method according to claim 3, the step of on the basis of $N_{PRB}$, $I_{TBS}$ and the number of transport block mapping layers, determining, by the base station, the TBS currently transmitting data as described in step b, comprising:

when $1 \leq N_{PRB} \leq 27$, finding the corresponding TBS in the layer 1 TBS table via the index ($I_{TBS}$, $4 \cdot N_{PRB}$) from the layer 1 TBS table, namely the value of layer 4 TBS;

when $28 \leq N_{PRB} \leq 110$, on the basis of $N_{PRB}$ and $I_{TBS}$, determining the layer 1 TBS from the layer 1 TBS table, and finding the corresponding TBS in the conversion relation of layers 1-4 TBS via the layer 1 TBS, namely the value of layer 4 TBS.

\* \* \* \* \*